US009916466B2

(12) United States Patent
Daino et al.

(10) Patent No.: US 9,916,466 B2
(45) Date of Patent: Mar. 13, 2018

(54) LOCKOUT-TAGOUT AND SAFETY COMPLIANCE SYSTEMS AND METHODS

(71) Applicant: Master Lock Canada, Inc., Oakville (CA)

(72) Inventors: Franco F. Daino, Muskego, WI (US); Mark Frederiksen, Toronto (CA); Somen Mondal, Toronto (CA); Matthew Paterson, Toronto (CA); Shaun Ricci, Toronto (CA)

(73) Assignee: MASTER LOCK CANADA, INC., Oakville, Ontario (CA)

( * ) Notice: Subject to any disclaimer, the term of this patent is extended or adjusted under 35 U.S.C. 154(b) by 423 days.

(21) Appl. No.: 14/215,151

(22) Filed: Mar. 17, 2014

(65) Prior Publication Data
US 2014/0283008 A1    Sep. 18, 2014

Related U.S. Application Data

(60) Provisional application No. 61/787,745, filed on Mar. 15, 2013.

(51) Int. Cl.
*G06F 21/62* (2013.01)
*G06F 21/60* (2013.01)
*G06F 21/44* (2013.01)

(52) U.S. Cl.
CPC .......... *G06F 21/6218* (2013.01); *G06F 21/44* (2013.01); *G06F 21/604* (2013.01)

(58) Field of Classification Search
None
See application file for complete search history.

(56) References Cited

U.S. PATENT DOCUMENTS

| 5,438,312 | A | 8/1995 | Lewis |
| 6,227,019 | B1 | 8/2001 | Chhatwal |
| 6,441,735 | B1 | 8/2002 | Marko et al. |
| 7,148,435 | B2 | 12/2006 | Lau et al. |
| 7,236,085 | B1 | 6/2007 | Aronson et al. |
| 7,624,525 | B2 | 12/2009 | Frank et al. |
| 2004/0030562 | A1* | 2/2004 | Williams ............... H04W 16/18 705/325 |
| 2004/0227631 | A1* | 11/2004 | Loudon .................. G08B 13/08 340/545.2 |
| 2005/0128083 | A1 | 6/2005 | Puzio et al. |
| 2007/0290789 | A1 | 12/2007 | Segev et al. |
| 2009/0090148 | A1 | 4/2009 | Kollin et al. |

(Continued)

FOREIGN PATENT DOCUMENTS

| CA | 2713011 | 2/2011 |
| EP | 774725 | 5/1997 |

(Continued)

OTHER PUBLICATIONS

International Search Report and Written Opinion from International Application No. PCT/CA2014/050254, dated Jun. 25, 1014.

(Continued)

*Primary Examiner* — Azizul Choudhury
(74) *Attorney, Agent, or Firm* — Calfee, Halter & Griswold LLP

(57) ABSTRACT

The present application discloses systems and methods for systems and methods of creating, administrating, assigning, and managing lockout-tagout (LOTO) procedures and other safety compliance procedures.

11 Claims, 22 Drawing Sheets

(56) References Cited

U.S. PATENT DOCUMENTS

| | | | |
|---|---|---|---|
| 2009/0234698 A1* | 9/2009 | Watson | G06Q 10/06 705/7.28 |
| 2010/0125528 A1 | 5/2010 | Reddy | |
| 2010/0269553 A1 | 10/2010 | Zhong | |
| 2010/0326146 A1 | 12/2010 | Power et al. | |
| 2011/0320230 A1 | 12/2011 | Podgurny et al. | |
| 2012/0259475 A1* | 10/2012 | Scharnick | G07C 9/00007 700/292 |
| 2013/0214903 A1* | 8/2013 | Kalous | G05B 1/01 340/5.61 |
| 2013/0325544 A1* | 12/2013 | Bonin | G06Q 10/06 705/7.28 |
| 2014/0176303 A1* | 6/2014 | Stratton | G08C 17/02 340/5.61 |

FOREIGN PATENT DOCUMENTS

| | | |
|---|---|---|
| JP | 2011-512595 A5 | 4/2011 |
| KR | 10-1094657 A4 | 12/2011 |
| WO | 2011072233 | 6/2011 |
| WO | 2012064822 A9 | 5/2012 |
| WO | 20130126753 | 8/2013 |
| WO | 2014022537 | 2/2014 |

OTHER PUBLICATIONS

International Preliminary Report on Patentabiltity from International Application No. PCT/US2011/059935, dated Oct. 2, 2013.
International Search Report from International Application No. PCT/US2013/027400, dated Jun. 26, 2013.

* cited by examiner

Assigning Users to Worker Classes

LOCKOUT-TAGOUT AND SAFETY COMPLIANCE SYSTEMS AND METHODS

CROSS REFERENCE TO RELATED APPLICATIONS

This application claims priority to and the benefit of U.S. Provisional Patent Application Ser. No. 61/787,745, entitled "LOCKOUT-TAGOUT AND SAFETY COMPLIANCE SYSTEMS AND METHODS" and filed Mar. 15, 2013, the entire disclosure of which is incorporated herein by reference. This application is also related to International Application Number PCT/US2011/059935, filed on Nov. 9, 2011, and entitled ELECTRONICALLY MONITORED SAFETY LOCKOUT DEVICES, SYSTEMS AND METHODS (the '935 Application), U.S. Provisional Patent Application Ser. No. 61/411,591, filed on Nov. 9, 2010, and U.S. patent application Ser. No. 13/774,911, filed on Feb. 22, 2013, and entitled SAFETY LOCKOUT SYSTEMS AND METHODS (the '911 Application), which three applications are hereby incorporated by reference in their entireties, except where directly conflicting with the present application.

BACKGROUND

The present disclosure generally relates to the field of lockout-tagout (LOTO) systems. The present disclosure relates more specifically to systems and methods of creating, administrating, assigning, and managing LOTO procedures and safety compliance procedures.

The locking out and tagging out of equipment are generally subject to strict LOTO procedures, which are periodically reviewed. There is typically a separate LOTO procedure for each piece of equipment subject to OSHA LOTO regulations (LOTO equipment). A particular piece of equipment may have an associated LOTO pr checklist showing the step or steps of its respective LOTO procedure. Some machines are complex in the sense that they utilize more than one type of energy, e.g., electrical, pneumatic, hydraulic, water, gas, chemical or coolant, and/or steam, that must be locked out before deemed safe to proceed with maintenance. Workers might be authorized to work on all of the LOTO energy types or on only a subset of them, e.g., a worker might only be permitted to work on electrical energy LOTO procedure steps. LOTO procedures are typically implemented using paper-based systems. For example, a worker needing to work on a piece of LOTO equipment might take a printed LOTO procedure checklist for that specific piece of equipment to the location of that piece of equipment and physically check off each step on the LOTO procedure checklist that worker is permitted to perform, perhaps in turn with workers authorized to perform LOTO procedure steps involving different energy types.

SUMMARY

The present application discloses systems and methods for systems and methods of creating, administrating, assigning, and managing lockout-tagout (LOTO) procedures and other safety compliance procedures.

One exemplary embodiment of the present disclosure relates to a LOTO procedure approval system. The LOTO system includes logic storing a proposed lockout-tagout (LOTO) procedure on one or more data storage devices; logic determining automatically with a computer whether the proposed LOTO procedure requires authorization from authorization personnel; logic automatically displaying on an electronic display an indication that the proposed LOTO procedure requires authorization responsive to a determination that the proposed LOTO procedure requires authorization from authorization personnel; and logic receiving with a computer authorization data related to the proposed LOTO procedure from the one or more authorization personnel.

Another exemplary embodiment of the present disclosure relates to a computer-implemented method of LOTO procedure approval. The computer-implemented method includes storing a proposed lockout-tagout (LOTO) procedure on one or more data storage devices; determining automatically with a computer whether the proposed LOTO procedure requires authorization from authorization personnel; automatically displaying on an electronic display an indication that the proposed LOTO procedure requires authorization responsive to a determination that the proposed LOTO procedure requires authorization from authorization personnel; and receiving with a computer authorization data related to the proposed LOTO procedure from the one or more authorization personnel.

Still another exemplary embodiment of the present disclosure relates to a data storage device having a non-transitory machine-readable medium with instructions (e.g., computer executable instructions or instructions interpreted to generate computer executable instructions) that cause one or more processors to perform various functions in connection with LOTO procedure approval. The steps of the process may include storing a proposed lockout-tagout (LOTO) procedure on one or more data storage devices; determining automatically with a computer whether the proposed LOTO procedure requires authorization from authorization personnel; automatically displaying on an electronic display an indication that the proposed LOTO procedure requires authorization responsive to a determination that the proposed LOTO procedure requires authorization from authorization personnel; and receiving with a computer authorization data related to the proposed LOTO procedure from the one or more authorization personnel.

Another exemplary embodiment of the present disclosure relates to a system for assigning LOTO procedures to workers. The LOTO system includes logic providing a computer user interface with which a user can select a LOTO procedure from the plurality of LOTO procedures stored on at least one data storage device; logic providing a computer user interface with which a user can select at least one worker to perform at least one portion of the selected LOTO procedure; and logic automatically accessing personnel data stored on the at least one data storage device related to the at least one worker assigned to perform the at least one portion of the selected LOTO procedure and automatically determining whether the at least one worker assigned to perform the at least one portion of the selected LOTO procedure is authorized to perform the at least one portion of the selected LOTO procedure by comparing at least some of the accessed personnel data to at least some data associated with the selected LOTO procedure.

Still another exemplary embodiment of the present disclosure relates to a computer-implemented method for assigning LOTO procedures to workers. The computer-implemented method includes providing a computer user interface with which a user can select a LOTO procedure from the plurality of LOTO procedures on the at least one data storage device; providing a computer user interface with which a user can select at least one worker to perform at least one portion of the selected LOTO procedure; and automatically with a computer accessing personnel data stored on the at least one data storage device related to the at least one worker assigned to perform the at least one portion of the selected LOTO procedure and automatically with a computer determining whether the at least one worker assigned to perform the at least one portion of the selected LOTO procedure is authorized to perform the at least one portion of the selected LOTO procedure by comparing at least some of the accessed personnel data to at least some data associated with the selected LOTO procedure.

Yet another exemplary embodiment of the present disclosure relates to a data storage device having a non-transitory machine-readable medium with instructions (e.g., computer executable instructions or instructions interpreted to generate computer executable instructions) that cause one or more processors to perform various functions in connection with assigning LOTO procedures to workers. The steps of the process may include providing a computer user interface with which a user can select a LOTO procedure from the plurality of LOTO procedures on the at least one data storage device; providing a computer user interface with which a user can select at least one worker to perform at least one portion of the selected LOTO procedure; and automatically with a computer accessing personnel data stored on the at least one data storage device related to the at least one worker assigned to perform the at least one portion of the selected LOTO procedure and automatically with a computer determining whether the at least one worker assigned to perform the at least one portion of the selected LOTO procedure is authorized to perform the at least one portion of the selected LOTO procedure by comparing at least some of the accessed personnel data to at least some data associated with the selected LOTO procedure.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

Figure 1:
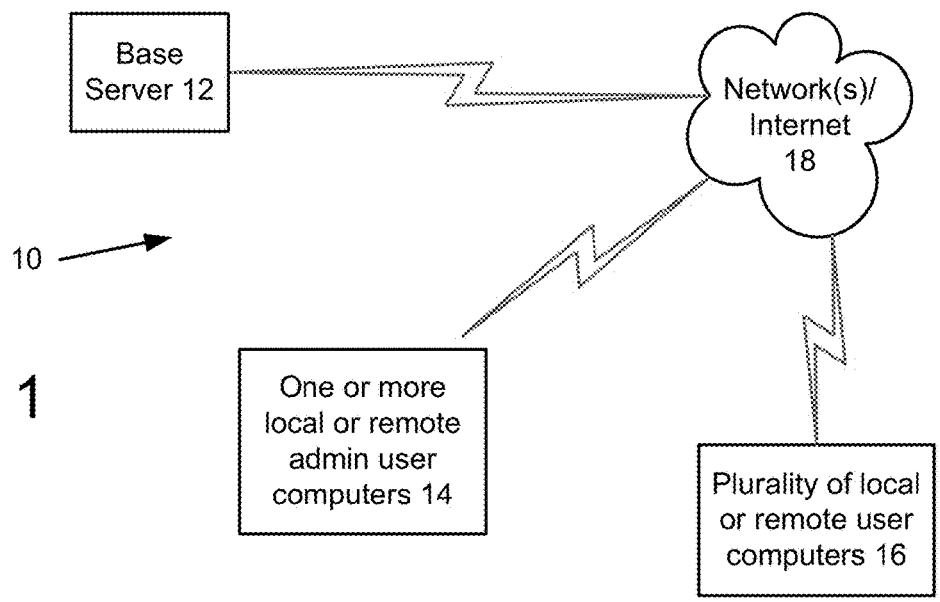
FIG. 1 is a schematic block diagram of an exemplary system having a base server.

Referring now to FIG. 1, a block diagram of an exemplary base system 10 is shown. Exemplary base system 10 permits users to display, add, and manipulate data about assets, personnel, security, activities, sites, and events relating to assets. Base system 10 includes a base server 12 in communication with one or more local or remote administrative computers 14 and a plurality of local or remote user computers 16 via one or more wired or wireless communication networks 18, e.g., the Internet. "Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc.

The base server 12 and/or the one or more local or remote administrative computers 14 and/or the plurality of local or remote user computers 16 have logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. In exemplary embodiments, the administrative computers 14 and the user computers 16 are identical or substantially the same, e.g., they have the same software stored thereon or accessible thereto that provides different functionality for different users based on data that determines which user is permitted to use certain logic (e.g., some software is permitted to be executed only by certain users) and data that determines which users are permitted to read, write, and/or modify specific data (e.g., some data is available only to certain users).

Figure 2:
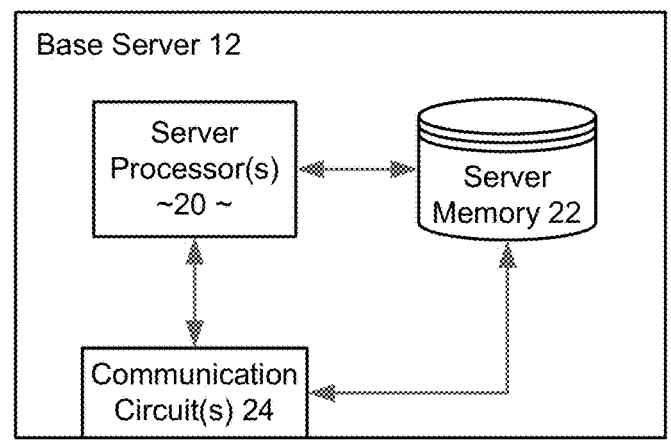
FIG. 2 is a schematic block diagram of an exemplary base server.

Referring now to FIG. 2, an exemplary base server 12 is shown. The base server 12 of FIG. 2 has one or more processors 20 in communication with a server memory 22 and one or more communication circuits 24. Server memory 22 includes one or more non-transitory computer readable media of one or more local or remote data storage devices. As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc.

Data for the various processes described herein can be stored on server memory 22 permitting that data to be accessed by the administrative computers 14 and the remote user computers 16 over the networks 18 using the communication circuits 24. The software used by the computers 14, 16 to perform the various functions and processes herein can be stored on one or more data storage devices local to the computers 14, 16, or can be downloaded or otherwise accessed from the server memory 22, or some combination of both. Thus, server memory 22 can also be used to store software for use by some of the administrative computers 14 and the remote user computers 16 to perform the various functions and processes described herein. For example, the computers 14, 16 can use a browser to access web-based software or other remote software hosted by the base server 12. The communication circuits 24 can include any suitable bus interface circuits for communicating with the computers 14, 16 over wired or wireless communication media (e.g., radiofrequency or optical communication media).

Figure 3:
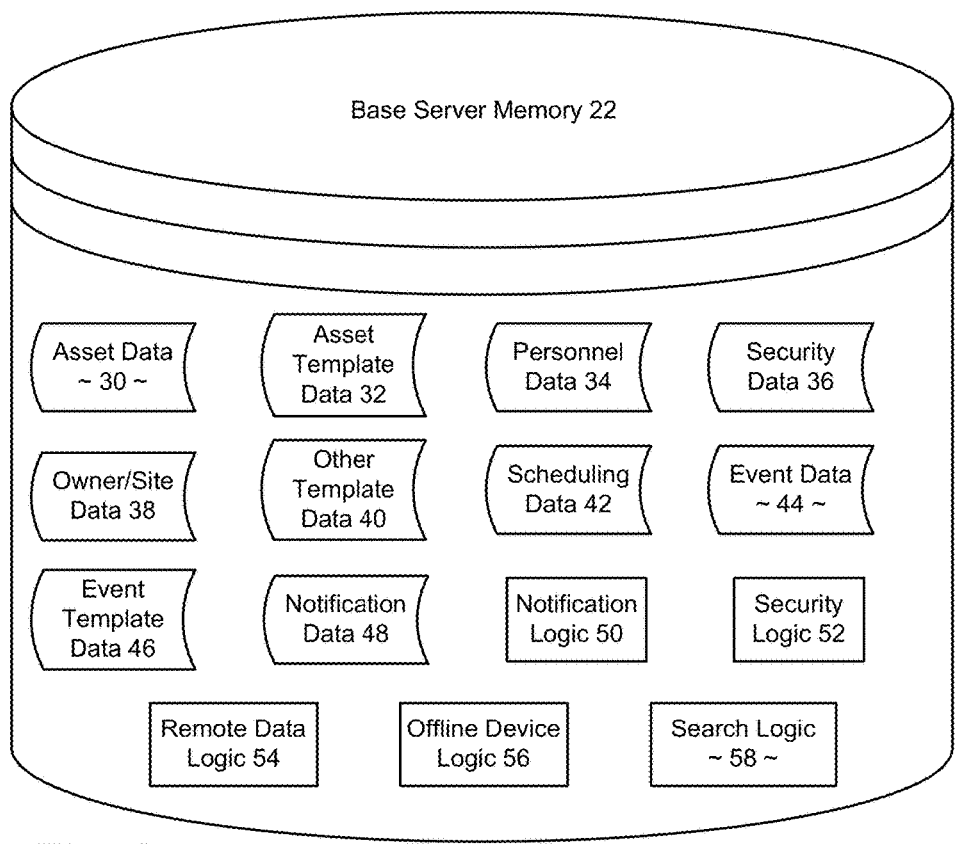
FIG. 3 is a schematic block diagram of an exemplary base server memory.

Referring now to FIG. 3, an exemplary base server memory 22 is shown. Base server memory 22 includes one or more non-transitory computer readable media of one or more local or remote data storage devices having stored thereon (or having a pointer thereto stored thereon) any one or more of the following types of data: asset data 30, asset template data 32, personnel data 34, security data 36, owner/site data 38, other template data 40, scheduling data 42, event data 44, event template data 46, and/or notification data 48. "Pointer" and "point to" as used herein in connection with data or software include, but are not limited to, storing on a non-transitory computer readable media of a data storage device one or more data indicating the location on another data storage device from where the data or software can be downloaded or otherwise accessed.

Asset data 30 includes data about various assets. Exemplary asset data 30 includes, for each asset, any one or more of the following: asset name, asset identifier (e.g., serial number or internal identifier, such as "Elevator 3C"), asset type (e.g., elevator, vehicle, construction crane, floor crane, hoist, sling, rope, rigging hardware, fall protection, work area, job site, safety equipment, valve, hose, human resources records, other personal protection equipment ("PPE")), vehicle type (e.g., automobile, light duty truck, medium duty truck, heavy duty truck, school bus, commercial bus, etc.), radiofrequency identification ("RFID") number (or some other unique identifier transmitted remotely), asset status (e.g., in service, in for repair, in need of repair, defective—purchase immediately, out of service, destroyed, quarantined, or removed from inventory), date identified (date entered into the server memory 22, 22', 300), the person to whom the asset is assigned, the organization that owns the asset, the job site associated with the asset, the organizational division associated with the asset, the last known location of the asset, a reference number for the asset, event data associated with the asset (e.g., data about inspections or other events carried out in the past or scheduled in the future with respect to the asset), scheduled events associated with the asset (e.g., data about inspections or other events that already occurred or are scheduled in the future for the asset), files associated with the asset (e.g., photographs and other documents that have been uploaded to base server memory 22 or otherwise accessed by or via base server memory 22 or indicated to by a pointer stored in base server memory 22), asset purchase cost, asset installation cost, number of incidents involving the asset, the date of each incident, the mileage of each incident, persons connected with each incident, number of investigations involving the asset, the date of each investigation, persons connected with each investigation, date put into service, date permanently removed from service, mileage put into service, mileage permanently removed from service, lost time (e.g., in hours or days), the cost of lost time (e.g., in dollars), test data and date, scanned test data and date, calibration data and date, scanned calibration data and date, other assets linked with or related to that asset (e.g., a Hook is linked with and related to a Crane), and other asset data.

In exemplary embodiments, asset data 30 is input and stored to the base server memory 22 by a user (e.g., an administrative user or full user) using administration logic 80 (FIG. 5) or by the user using administration logic 80 to upload or otherwise access or point to asset data. Base server memory 22 can also have stored thereon asset template data 32, which provides suggested asset data for various kinds of assets. A user has asset template data 32 available as a starting point when creating asset data 30 (i.e., adding asset data 30 to the base server memory 22). When a user is in the process of adding a particular asset to the base server memory 22, the user can download or otherwise access asset template data 32 for that kind of asset suggesting how some or all asset data fields should be completed and all, some, or none of that asset template data need be included in the asset data saved by the user for a particular asset to the base server memory 22.

Base server memory 22 can also have stored thereon personnel data 34, which are data about various persons. Exemplary personnel data 34 includes, for each person, any one or more of the following: first name, middle name, last name, contact information, assets assigned to or otherwise associated with the person, assets or types of assets the person is permitted to use, assets or types of assets the person is permitted to have events with respect to (e.g., assets or types of assets the person is qualified to inspect), types of data the person is permitted to add, types of data the person is permitted to modify and/or delete, software modules the person is able to access, current job title, total number of incidents for that person, the date of each incident, asset connected with each incident, lost time, cost of lost time, OSHA Form 300 data for each injury: date of injury or illness onset, where the event occurred, description of the injury or illness, parts of body affected, and object/substance that directly injured the person or made the person ill, one or more classification codes for the injury (e.g., death, one or more days away from work, remained at work, but was transferred or restricted, and other recordable case), the number of days the worker was away from work, the number of days the worker was transferred or restricted, and type of injury or illness (e.g., injury, skin disorder, respiratory condition, poisoning, hearing loss, or other injury or illness), certifications, drug testing dates, description of any adverse drug testing results, work days present, missed work days, missed fire drills, scan-in dates and times, scan-out dates and times, safety meeting attendance dates, dates safety meetings were missed, employee agreement acknowledged and data and time of acknowledgement, employee handbook acknowledged and data and time of acknowledgement, rules acknowledged and data and time of acknowledgement, regulations acknowledged and data and time of acknowledgement, current login status, size of fitted assets that best fit the worker, other sizes of fitted assets that the worker is permitted to use, training needed for each LOTO class, whether worker has receive training needed for each LOTO class, HR training needed, whether worker has receive HR training needed, and other personnel data 34.

Base server memory 22 can also have stored thereon security data 36, which are data used to control access by persons to the system 10. Exemplary security data includes any one or more of the following: password data for each person able to access the system 10, types of data the person is permitted to add, types of data the person is permitted to modify and/or delete, software modules the person is able to access, and other security data.

Base server memory 22 can also have stored thereon owner/site data 38, which are data about various entities, locations, and sites. Exemplary owner/site data 38 includes any one or more of the following: the name of various entities that can own assets, possess assets, repair assets, inspect assets, site data, location data for any entity, site data, which is location data for any specific site at a location, and other owner/site data 38.

In exemplary embodiments, personnel data 34, security data 36, and owner/site data 38, will also be input and stored to the base server memory 22 by a user (e.g., an administrative user) using administration logic 80 (FIG. 5) or by the user using administration logic 80 to upload or otherwise access or link asset data. Base server memory 22 can also have stored thereon other template data 40, which provides suggested asset data for personnel data 34, security data 36, and owner/site data 38. A user has other template data 40 available as a starting point when creating personnel data 34, security data 36, and owner/site data 38 (i.e., adding any of the foregoing to the base server memory 22). When a user is in the process of adding data to the base server memory 22, the user can download or otherwise access other template data 40 for that kind of data suggesting how some or all data fields should be completed and all, some, or none of that other template data need be included in the data saved by the user to the base server memory 22.

Base server memory 22 can also have stored thereon scheduling data 42, which are scheduling data about various events that are scheduled to occur. Exemplary scheduling data 42 includes for each event, any one or more of the following: a name for the event, the date that an event was initially saved to the base server memory 22, the date an event is scheduled to occur, dates an event was scheduled to occur but did not occur (audit data), any checklist and/or procedure the user is to follow during the event to be displayed to the user via a computer generated display (or a pointer to different data with that data stored therein), the user(s) assigned to complete the event, the priority of the event, and other scheduling data 42.

Base server memory 22 can also have stored thereon event data 44, which are data about various specific events that have already occurred for an asset, e.g., inspections of the asset that have already been performed. Exemplary event data 44 includes for each event, any one or more of the following: an event name, a type of event (e.g., a periodic inspection or an ad hoc inspection), the date and time the event started and/or was completed, one or more results of the event, a change in status, if any, of the asset, some or all of the scheduling data 42 for the event, if any, data collected during the event (e.g., inspection checklist data input by the user using a computer generated user interface), which user entered each datum of the event data (e.g., for each datum, who had logged into the machine used to input that datum), any checklist and/or procedure the user was to have followed during the event that was displayed to the user via a computer generated display (or a pointer to different data with that data stored therein), and other event data 44.

In exemplary embodiments, event data 44 will be input and stored to the base server memory 22 by a user (e.g., an administrative user) using event administration logic 82 (FIG. 5) or by the user using event administration logic 82 to upload or otherwise access or link event data 44. Base server memory 22 can also have stored thereon event template data 46, which provides suggested event data for various kinds of events. A user has event template data 46 available as a starting point when creating event data 44 (i.e., adding event data 44 to the base server memory 22). When a user is in the process of adding a particular event to the base server memory 22, the user can download or otherwise access event template data 46 for that kind of event suggesting how some or all event data fields should be completed and all, some, or none of that event template data need be included in the event data 44 saved by the user for a particular event to the base server memory 22.

Base server memory 22 can also have stored thereon notification data 48, which are data about various specific notifications that are scheduled to be sent or have already been sent. Exemplary notification data 48 includes for each notification, any one or more of the following: a notification name, a type of notification (e.g., a periodic notification or an alert), the text of the notification, the intended recipient(s) of the notification, the intended recipient(s) of the notification for whom a delivery problem occurred, the date the notification is to be sent, the date the notification was actually sent, and other notification data 48.

The base server memory 22 can also have stored thereon a plurality of logic modules with software causing one or more processors to perform the various functions and processes herein. For example, the base server memory 22 can have stored thereon any one or more of the following logic modules: notification logic 50, security logic 52, remote data logic 54, offline device logic 56, and/or search logic 58.

Notification logic 50 causes one or more circuits, e.g., one or more processors, to generate and transmit notifications to one or more users in accordance with notification data 48 and other data. For example, as a user schedules an event, asset data 30, personnel data 34, scheduling data 42, event data 44, and/or notification data 48 might indicate that one or more notifications are to be sent or queued for later sending. Notifications can be any one or more different types of direct notifications, such as texts, e-mails, and/or automated phone calls presenting audio messages by playing back pre-recorded audio data files stored on one or more data storage devices, e.g., audio files stored on base server 22. Notifications can also take the form of indirect notifications by interactions with other software, i.e., sending a message to the other software, which displays the notification to the user using its own display, such as (a) sending for display the text of a pop-up notification to a computer such as a handheld computer (e.g., computer 14, 16), a laptop computer (e.g., computer 14, 16), a desktop computer (e.g., computer 14, 16), or a special purpose computer (e.g., a wireless printer, computer 14, 16 or RFID reader 110 in the '911 application), (b) sending a calendar message to cause integral or 3rd party calendar software to enter an event entry on an electronic calendar of the recipient, (c) sending a message to integral or 3rd party workflow software (e.g., sending a message to SAP brand enterprise resource planning software via its API or to MAXIMO brand enterprise resource planning software via its API), and/or (d) sending a message to be collected with other messaged (e.g., sending a message to an iOS device to be collected with other messages on the pull-down iOS Notification Center screen), etc. For example, if an inspection of an asset is scheduled to be performed by a worker, the notification logic 50 might (a) immediately directly send an e-mail notification about the scheduled inspection to one or more users of the asset who are flagged to receive notifications about that particular assert, and/or (b) immediately directly send or queue for later direct sending a notification that the inspection has been scheduled to be performed by that worker, such as in a daily e-mail to the worker indicating the tasks for that day to be performed by that worker, and/or (c) send a calendar event corresponding to the scheduled inspection to the worker's work calendar software. In exemplary embodiments, personnel data 34 can indicate which notifications are to be sent to each person and in which format(s), i.e., can indicate which persons are subscribers of which notifications and the manner(s) of delivery. Similarly, in exemplary embodiments, administration logic 80 can present to the user a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which administrative personnel or other users can select which notifications are to be sent to each person and in which format(s), i.e., can indicate which persons are subscribers of which notifications and the manner(s) of delivery (depending on permissions).

Security logic 52 causes one or more circuits, e.g., one or more processors, to ensure that each person is permitted to read, write, and modify only the data that that person is authorized to read, write, and modify, respectively, and that each person is permitted to execute only the logic modules that that person is authorized to execute, based on personnel data 34 and/or security data 36. As an example, security logic 52 might require that users enter a pre-approved username and password at a landing page of a browser session before the user may execute any of the logic modules on the base server memory 22, and might limit access by the user app to a particular subset of the logic modules based on respective personnel data 34 and/or security data 36. As an example, security logic 52 might require that a user have previously entered a pre-approved username and password into a stand-alone app running on a handheld computer (or scanning a security badge or other electronic access card) before the stand-alone app is permitted to access any of the asset data 30, asset template data 32, personnel data 34, security data 36, owner/site data 38, other template data 40, scheduling data 42, event data 44, event template data 46, and/or notification data 48, and might limit access by the app to a particular subset of that data based on respective personnel data 34 and/or security data 36.

Remote data logic 54 causes one or more circuits, e.g., one or more processors, to provide any of the foregoing data to the one or more local or remote administrative computers 14 and computers of the plurality of local or remote user computers 16 in response to requests for such data by software executing on the computers 14, 16. For example, a user using a computer 16 might actuate a user interface to indicate that the user wants to be presented with all the asset data for a particular asset. In response, the remote data logic 54 cause one or more processors to retrieve that asset data and transmit that asset data to the computer 16 to be presented to the user.

Offline device logic 56 causes one or more circuits, e.g., one or more processors, to interact with computers 14, 16 and temporarily transfer data thereto to permit the computers 14, 16 to perform activities with asset data 30, asset template data 32, personnel data 34, security data 36, owner/site data 38, other template data 40, scheduling data 42, event data 44, event template data 46, and/or notification data 48 while there is no direct communication with the base server 12. As an example, the offline device logic 56 can present to the user a software user input, e.g., a pull-down menu or an icon with which the user can indicate to the server 12 that the user would like offline access to particular event data, e.g., event data for a particular period of time or for a particular event. In response to such a user indication, the offline device logic 56 causes one or more circuits, e.g., one or more processors, to transfer data pertaining to that event, e.g., a subset of event data 44, to the data storage device of the computer 16. The user then performs the event, e.g., performs the inspection and generates additional corresponding event data about the event, such as new event data with the results of the inspection. When the computer 16 is next in communication with the server 12 via the network(s) 18, the offline device logic 56 causes one or more circuits, e.g., one or more processors, to transfer cached data pertaining to that event, e.g., the new event data, from the data storage device of the computer 16 to the server 12.

For example, if an inspection is to be performed by a user with a handheld computer 16 in a location where there is no access between the handheld computer 16 and the base server 12, the user actuates the software user input indicating to the offline device logic 56 that the user would like offline access to inspection data (e.g., for a particular inspection or for all inspections or a subset of inspections scheduled for that day or other period of time). In response to such a user indication, the offline device logic 56 causes one or more circuits, e.g., one or more processors, to transfer inspection checklists and asset data for the assets to be inspected to the data storage device of the computer 16. The user then performs the inspection(s) and generates additional new event data and/or asset data with the results of the inspection(s). When the computer 16 is next in communication with the server 12 via the network(s) 18, the offline device logic 56 causes one or more circuits, e.g., one or more processors, to transfer data pertaining to that event, e.g., the new event data and asset data, from the data storage device of the computer 16 to the server 12.

Search logic 58 causes one or more circuits, e.g., one or more processors, to receive queries about data and to search for and present the results of queries of any of the data to which the corresponding user has access. In response, the search logic 58 identifies any data responsive to the query and presents that data to the user, subject to personnel data 34 and security data 36. For example, a worker might want to identify the status of all the elevators in the asset data 30 and either select from a drop-down menu corresponding to asset type the "elevator" type and/or enter the word "elevator" in a freeform text field corresponding to asset identifier. In response, the search logic 58 identifies any data responsive to the query and presents the elevators in the system that the user may access.

Figure 4:
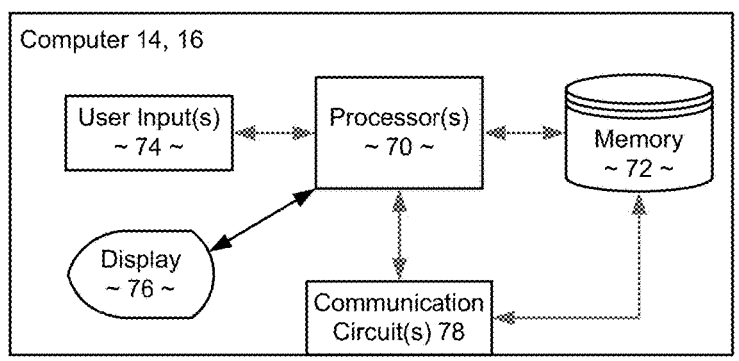
FIG. 4 is a schematic block diagram of an exemplary computer for use with the exemplary base server of FIG. 3.

Referring now to FIG. 4, a block diagram of an exemplary computer 14, 16 is shown. Computer 14, 16 comprises one or more processors 70 in communication with a memory circuit 72, one or more user input circuits 74, a display circuit 76, and one or more communication circuits 78. Memory circuit 72 comprises one or more non-transitory computer readable media of one or more data storage devices. In the context of a handheld computer, this memory circuit might include flash memory and/or RAM and/or ROM memories. In the context of a desktop or laptop computer, this memory circuit might include one or more fixed disk drives and/or RAM and/or ROM memories. Memory circuit 72 will have stored thereon logic modules for performing the various functions and processes described herein or a program to access such logic modules from a remote memory, such as base server memory 22 (e.g., a browser program to access such logic modules from base server memory 22). User input circuits 74 can include any one or more of buttons, keyboards, keys, touchpads, touchscreens, and associated support chips, and/or one or more communication circuits (e.g., RS-232 or USB) for an external keyboard or other external user input device, such as a mouse, track pad, or other pointing device, or other user input devices. Display circuit 76 can include any one or more of LEDs, N×M textual displays, matrix displays on which a graphical user interface ("GUI") can be presented, e.g., a color or monochrome liquid crystal display ("LCD") or organic light-emitting diode ("OLED") display, with associated drive chips, and/or one or more graphics circuits (e.g., VGA or HDMI) for an external display, or other displays. Communication circuits 78 include antennas and/or data ports and driver chips for sending and receiving communications with devices external to the computer 14, 16. Communication circuits 78 can include any one or more of WiFi antennas and circuitry, LTE antennas and circuitry, GPS antennas and circuitry, CDPD antennas and circuitry, GPRS antennas and circuitry, GSM antennas and circuitry, UMTS antennas and circuitry, and other antennas and circuitry, USB ports and circuitry (e.g., standard, micro, mini, etc.), RS-232 ports and circuitry, proprietary ports and circuitry (e.g., APPLE 30-pin and Lightning ports), RFID antennas and circuitry, NFC antennas and circuitry, bump technology antennas and circuitry, a Bluetooth antenna and circuitry, and other antennas, ports, and circuitry.

Figure 5:
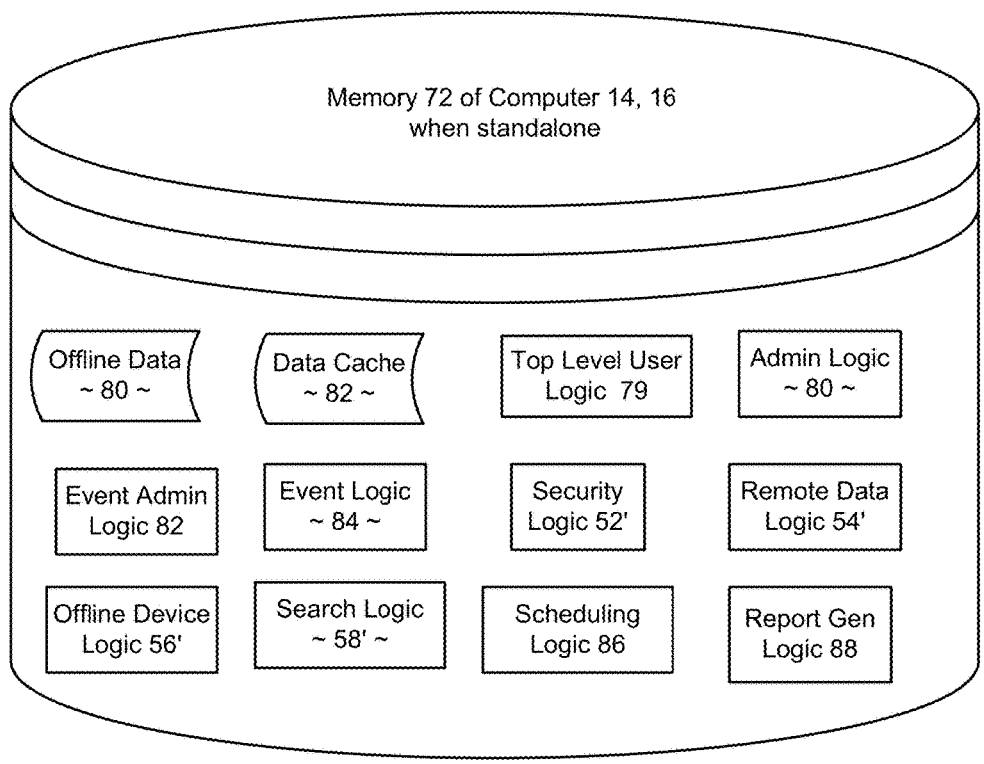
FIG. 5 is a block diagram showing an exemplary memory, including exemplary logic modules, of the computer of FIG. 4.

With a base server memory 22 in the configuration of FIG. 3, in exemplary embodiments, the one or more local or remote administrative computers 14 and computers of the plurality of local or remote user computers 16 would have stand-alone software stored in data storage devices to implement other functions and processes described herein. FIG. 5 is a block diagram showing the logic modules of an exemplary memory 72 for computer 14, 16 for use with a base server memory 22 in the configuration of FIG. 3. Memory 72 can have stored thereon offline data 81 and/or cached data 82.

Offline data 81 is data transferred by offline device logic 56 of server 12 to permit the computer 14, 16 to perform activities with asset data 30, asset template data 32, personnel data 34, security data 36, owner/site data 38, other template data 40, scheduling data 42, event data 44, event template data 46, and/or notification data 48 while there is no direct communication with the base server 12. Cached data 82 is data collected by the computer while offline from the base server 12. When the computer 16 is next in communication with the server 12 via the network(s) 18, the offline device logic 56 causes one or more circuits, e.g., one or more processors, to transfer the cached data 82 pertaining to that event, e.g., the new event data, from the data storage device 72 of the computer 16 to the server 12.

The memory 72 of computer 14, 16 can also have stored thereon a plurality of logic modules with software causing one or more processors to perform the various functions and processes herein. For example, the memory 72 can have stored thereon any one or more of the following logic modules: top level user logic 79, administration logic 80, event administration logic 82, event logic 84, security logic 52', remote data logic 54', offline device logic 56', search logic 58', scheduling logic 86, and/or report generation logic 88.

Top level user logic 79 presents to users a selection of options that cause other logic modules to execute. For example, in exemplary embodiments, top level user logic 79 can present to a user a "home" display having one or more software user inputs, e.g., one or more pull-down menus or one or more icons with which a user can perform any one or more of the following: (a) add or edit an asset (i.e., cause administration logic 80 to execute), (b) add or edit event data (i.e., cause event administration logic 82 to execute), (c) start an event such as a pre-scheduled event or an unscheduled event (i.e., cause event logic 84 to execute), (d) schedule an event (i.e., cause scheduling logic 86 to execute), execute a search with a user query (i.e., cause search logic 52' to execute), (e) generate a report (i.e., cause reporting logic 88 to execute), (f) display jobs or other events already assigned to the user or another user, (g) view and/or set up owners, locations, and job sites (i.e., cause administration logic 80 to execute with respect to owner/site data 38), or (h) return to the "home" display.

Administration logic 80 permits users to add, modify, and/or delete (depending on security permissions) asset data 30, asset template data 32, personnel data 34, security data 36, owner/site data 38, and/or other template data 40. More specifically, in exemplary embodiments, administration logic 80 can present to the user a software user input, e.g., one or more pull-down menus or drop-down menus, one or more icons or hyperlinks, and/or one or more freeform text fields into which text can be freely typed with a computer keyboard to load, save, edit, add, modify, and/or delete (depending on security permissions) data 30, 32, 34, 36, 38, 40. If asset template data 32 or other template data 40 is available, administration logic 80 can present to the user a software user input, e.g., one or more pull-down menus and/or one or more icons, with which the user can cause the administration logic 80 to load asset template data 32 or other template data 40 as part of creating other data e.g., data 30, 32, 34, 36, 38, 40.

Event administration logic 82 permits users to add, modify, and/or delete (depending on security permissions) event data 44 and/or event template data 46. More specifically, event administration logic 82 can present to the user a software user input, e.g., one or more pull-down menus or drop-down menus, one or more icons or hyperlinks, and/or one or more freeform text fields into which text can be freely typed with a computer keyboard to load, save, edit, add, modify, and/or delete (depending on security permissions) event data 44 and/or event template data 46. If event template data 46 is available, event administration logic 82 can present to the user a software user input, e.g., one or more pull-down menus and/or one or more icons, with which the user can cause the event administration logic 82 to load event template data 46 as part of creating the event data 44.

Event logic 84 implements event data 44 on the computer 14, 16. For example, in the context of an inspection, event logic 84 prompts the user on the display 76 with aspects of the inspection consistent with the event data and accepts new event data from the user via the user inputs 74 about the inspection. In exemplary embodiments, the event logic 84 can present to the user a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard to perform any one or more of the following: (a) start the inspection, (b) select the type of inspection, (c) present the user with one or more inspection checklists (e.g., a checklist for different portions of the asset, such as for a fall arrest harness a webbing checklist, a stitching checklist, and a hardware checklist), (d) switch between inspection checklists, (e) permit the user to save a draft of the inspection data, (f) permit the user to save the inspection data and send the inspection data to the server memory 22 (and/or save the inspection data as offline data 81 to later be sent to the server memory 22), (g) select an inspection status (e.g., inspection performed, could not inspect, asset destroyed, asset not in use), (h) input the current location of the asset, (i) input the date of the inspection (in the alternative the current date can be forced into the field), (j) input the name of the person performing the inspection (in the alternative, the name of the person who logged in is forced into the field), (k) select an overall result for the inspection (e.g., pass, fail N/A), and (1) permit the user to add data about each entry on the checklist, e.g., a pass icon, a fail icon, an N/A icon, a free form text box into which the user can add text about a deficiency, a free form text box into which the user can add text recommending one or more actions, an icon to take a photograph, an icon to add an existing photograph data file to the event data 44, a free form text box into which the user can annotate a photograph, a free form text box below a photograph into which the user can add text explaining the photograph, a menu or a select-one set of radio buttons from which the user can select one of several actions to be taken with respect to the asset, a series of icons, a menu, or a select-all set of radio buttons with which the user can select many actions to be taken with respect to the asset, and/or other user interface items.

Security logic 52' permits users to log into and log out of the system. More specifically, in exemplary embodiments, security logic 52' can present to the user a software user input, e.g., one or more pull-down menus or drop-down menus, one or more icons or hyperlinks, and/or one or more freeform text fields into which text can be freely typed with a computer keyboard to enter security information, such as a company (if the system 10 is used by numerous companies, e.g., companies that are not permitted to see each others' data), a user name, and/or a password. Security logic 52' interfaces with security logic 52 of base server 12 to provide or deny that user access to local and remote functions and processes based on a comparison by security logic 52 of the entered security information to the stored security data 36.

Remote data logic 54' causes the processor(s) 70 to interface with the remote data logic 54 to provide any of the foregoing data to the one or more local or remote administrative computers 14 and computers of the plurality of local or remote user computers 16 in response to requests for such data by software executing on the computers 14, 16. For example, a user using a computer 16 might actuate a user interface to indicate that the user wants to be presented with all the asset data for a particular asset. In response, the remote data logic 54' communicates with the remote data logic 54 to cause one or more processors to retrieve that asset data and transmit that asset data to the computer 16 to be presented to the user.

Offline device logic 56' causes the processor(s) 70 to interface with the offline device logic 56' to temporarily transfer offline data 81 data from the base server 12 to the computer 14, 16 to permit the computers 14, 16 to perform activities, for example, with asset data 30, asset template data 32, personnel data 34, security data 36, owner/site data 38, other template data 40, scheduling data 42, event data 44, event template data 46, and/or notification data 48 while there is no direct communication with the base server 12. As an example, the offline device logic 56' can present to the user a software user input, e.g., a pull-down menu or an icon with which the user can indicate to the server 12 that the user would like offline access to particular event data, e.g., event data for a particular period of time or for a particular event. In response to such a user indication, the offline device logic 56' communicates that request to the offline device logic 56, causes one or more circuits, e.g., one or more processors, to transfer data pertaining to that event, e.g., a subset of event data 44, to the offline device logic 56', which stores the offline data 81 on the data storage device of the computer 14, 16.

Search logic 58' permits users to formulate queries about data and sends those queries to search logic 58 of base server 12. Search logic 58' also receives data responsive to those queries from search logic 58 of base server 12 and presents the results to the user via display circuit 76. More specifically, in exemplary embodiments, search logic 58' can present to the user a software user input, e.g., one or more pull-down menus or drop-down menus, one or more icons or hyperlinks, and/or one or more freeform text fields into which text can be freely typed with a computer keyboard corresponding to any of the data in the base server memory 22, with which the user can indicate to the server 12 the user query. In response, the search logic 58 identifies any data responsive to the query and sends that data to search logic 58', which presents that data to the user (subject to personnel data 34 and security data 36). For example, a worker might want to identify the status of all the elevators in the asset data 30 and either select from a drop-down menu corresponding to asset type the "elevator" type and/or enter the word "elevator" in a freeform text field corresponding to asset identifier, which search logic 58' sends to search logic 58. In response, the search logic 58 identifies any data responsive to the query and sends that data to search logic 58', which displays on display 76 the elevators in the system that the user may access.

Scheduling logic 86 permits users to schedule events and modify scheduling data 42, such as the parameters of already scheduled events, subject to restrictions or authorizations provided in personnel data 34 and security data 36. More specifically, in exemplary embodiments, scheduling logic 86 can present to the user a software user input, e.g., one or more pull-down menus or drop-down menus, one or more icons or hyperlinks, and/or one or more freeform text fields into which text can be freely typed with a computer keyboard to enter or modify scheduling data 42, such as selecting an event to schedule, selecting a scheduled event to modify, adding a date or a date and a time for an event, modifying a date or a date and a time for an event and/or deleting a scheduled event. Security logic 52' interfaces with security logic 52 of base server 12 to provide or deny that user access to local and remote functions and processes based on a comparison by security logic 52 of the entered security information to the stored security data 36.

Report generation logic 88 permits users to generate, transmit, print, and/or transmit reports of any of the foregoing data, subject to personnel data 34 and security data 36. More specifically, in exemplary embodiments, scheduling logic 86 can present to the user a software user input, e.g., one or more pull-down menus or drop-down menus, one or more icons or hyperlinks, and/or one or more freeform text fields into which text can be freely typed with a computer keyboard, e.g., an icon for a completed inspection or an icon to print a list of search results, to cause any of the processors to gather data corresponding to the request and generate a report that can be viewed, printed, and/or transmitted.

Figure 6:
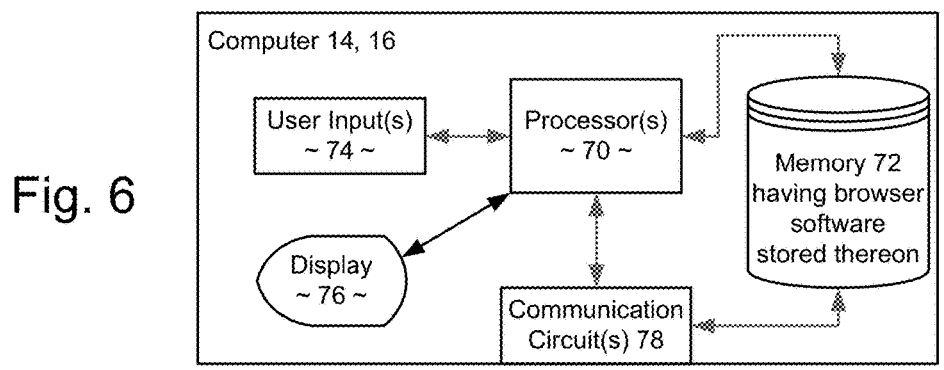
FIG. 6 is a schematic block diagram of an exemplary web-enabled computer for use with the exemplary base server of FIG. 7.
Figure 7:
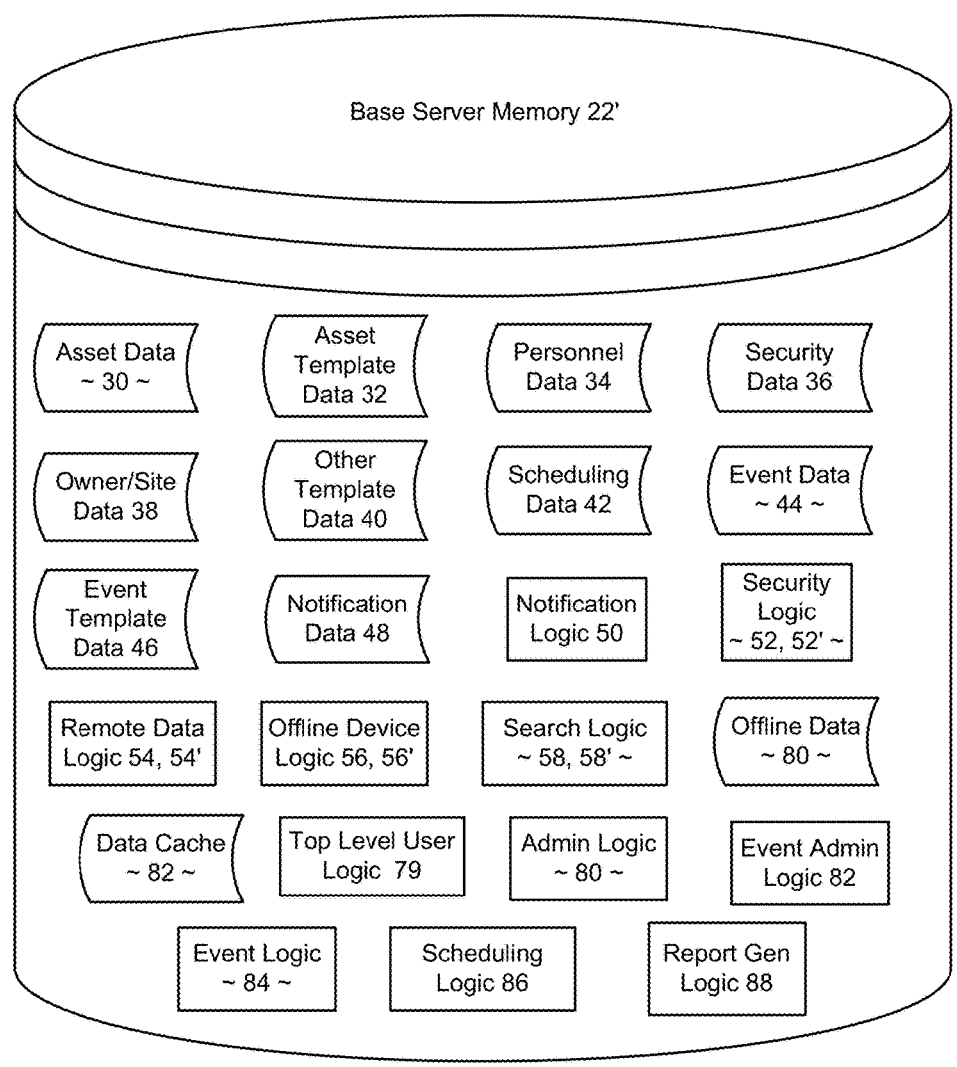
FIG. 7 is a schematic block diagram of another exemplary base server memory.

For a computer 14, 16 that is not a standalone computer, e.g., no standalone software performing the functions and processes of FIG. 5, a web-based configuration can be used in exemplary embodiments, permitting virtually any computer with a browser to perform the various functions and processes described herein. More specifically, in exemplary embodiments, the memory 72' of computer 14, 16 can comprise web browser software, as shown in FIG. 6. In this configuration, the memory 22 of base server 12 can include any one or more of the data and logic modules of FIG. 5 in addition to any one or more of the data and modules shown in FIG. 3, as shown in FIG. 7. A user directs the browser software to the base server 12 with the configuration of FIG. 7, and the logic modules present software user inputs to the user, accepts commands from the user, displays data to the user, accepts data from the user, and otherwise interact with the user, as described herein.

As mentioned above, the various systems of FIGS. 1-7 can be used to facilitate inspections (where exemplary "events" are inspections) of assets, such as elevators, vehicles (e.g., automobile, light duty truck, medium duty truck, heavy duty truck, school bus, commercial bus, etc.), personal projection equipment ("PPE"), etc. In exemplary embodiments, asset data 30 and asset template data 32 can include data about assets to be inspected, personnel data 34 can include data about workers who will be inspecting assets, scheduling data 42 can include data about scheduled inspections, event data 44 and event template data 46 can include blank inspection checklists and data completing inspection checklists, and notification data 48 can include notifications of scheduled inspections to the people assigned to do the inspections of the assets, people to whom the assets are assigned, and managers of both the people assigned to do the inspections and the people to whom the assets are assigned.

Systems and Methods for Locking Out and Tagging Out Equipment

In addition to using the systems and methods of FIG. 7 for facilitating inspections, or in the alternative, the various systems of FIGS. 1-7 of the present application can be used to facilitate lockout-tagout ("LOTO") procedures and other safety compliance procedures. LOTO procedures are discussed in general in the '911 Application. In exemplary LOTO embodiments, "events" can include any of various LOTO functions, such as an entire LOTO procedure or higher granularity such as isolating an isolation point, locking out a device, tagging out a device, working on a device, removing a LOTO tag from a device, and/or removing a LOTO lock from a device. In the context of LOTO systems and methods, asset data 30 and asset template data 32 can include data about assets to be locked out, tagged out, and worked on; personnel data 34 can include data about workers who will be locking out, tagging out, working on assets, and/or removing LOTO locks and tags from assets; scheduling data 42 can include data about scheduled LOTO events; event data 44 and event template data 46 can include blank LOTO procedures and data completing LOTO procedures; and notification data 48 can include notifications of LOTO events. The logic described above functions with respect to LOTO data and LOTO events.

In exemplary LOTO systems, a base server 12 having a memory configuration like FIG. 3 can be used with a standalone computer 14, 16 of FIG. 4 having a memory configuration like FIG. 5, where the data and logic include LOTO data and logic for facilitating LOTO events.

Figure 8:
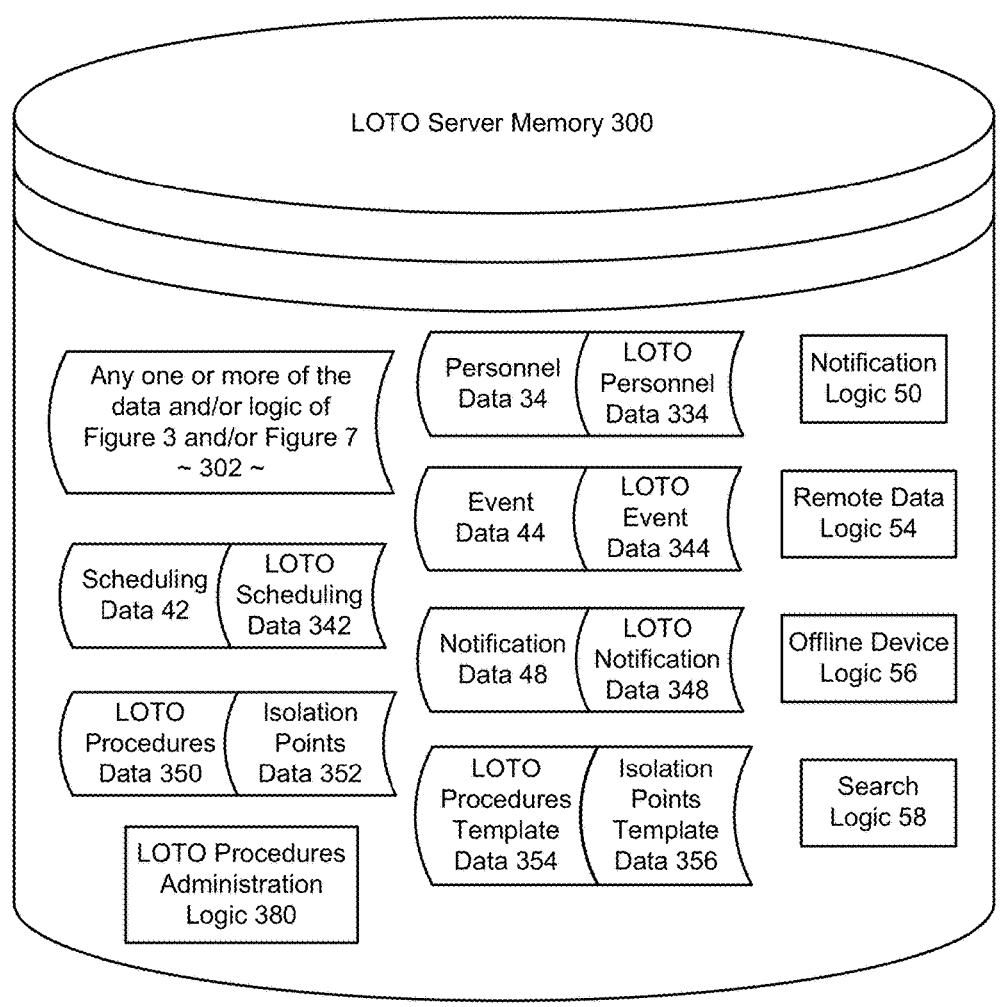
FIG. 8 is a block diagram of an exemplary lockout-tagout (LOTO) server memory of an exemplary LOTO system.

FIG. 8 is a block diagram of an exemplary server memory 300 of a LOTO system having the same general configuration as FIG. 1 (a server in communication with a plurality of user computers 14, 16 via one or more networks, e.g., the Internet) and having a LOTO server having the same general configuration as FIG. 2 (one or more server processors in circuit communication with LOTO server memory 300 and one or more communication circuits). In exemplary embodiments, LOTO server memory 300 can include any one or more of the various data and logic modules shown in FIG. 3 and discussed above in the context of the embodiments of FIGS. 1-5 and/or any one or more of the various data and logic modules shown in FIG. 7 and discussed above in the context of the embodiments of FIGS. 6-7 (reference 302 in FIG. 8). Thus, the system can facilitate both inspections of assets and locking out and tagging out of assets, e.g., elevators and machines.

In exemplary embodiments, the general categories of data described above can include LOTO data, e.g., personnel data 34 on LOTO server memory 300 can include LOTO personnel data 334. In exemplary embodiments, LOTO personnel data 334 can include any one or more of: the specific LOTO procedures the person is authorized to perform (with or without additional approval from another person, e.g., a foreman or other manager), the specific LOTO procedures the person is authorized to perform without further approval, the LOTO procedure energy class(es) with which the person is authorized to work (e.g., electrical, pneumatic, hydraulic, water, gas, chemical or coolant, and/or steam), and other LOTO personnel data.

As another example, in exemplary embodiments, scheduling data 42 on LOTO server memory 300 can include LOTO event data 344 for assets and event template data 46 can include LOTO event template data 346, i.e., suggested LOTO event data for assets. Exemplary LOTO scheduling data 342 includes for at least one LOTO event, any one or more of the following: a name for the LOTO event, the date that the LOTO event was initially saved to the LOTO server memory 300, the date the LOTO event is scheduled to occur, length of time the asset is expected to be unavailable because it is locked out and tagged out, dates the LOTO event was scheduled to occur but did not occur (for audit purposes), the specific LOTO procedure to be followed the particular LOTO event for this particular asset to be displayed to the user via a computer generated display (or a pointer to different data with that data stored therein), any other checklist and/or procedure the user is to follow during the LOTO event to be displayed to the user via a computer generated display (or a pointer to different data with that data stored therein), and/or other LOTO scheduling data 342.

As yet another example, in exemplary embodiments, event data 44 on LOTO server memory 300 can include LOTO event data 344 for assets, i.e., data about various specific LOTO events that have already occurred for an asset (was locked out and tagged out and/or LOTO tags and locks removed), and event template data 46 can include LOTO event template data 346 (suggested LOTO event data for assets). Exemplary LOTO event data 344 includes for each LOTO event, any one or more of the following: a LOTO event name, a type of LOTO event (e.g., a periodic LOTO event or an ad hoc LOTO event or an emergency LOTO event), the date and time the LOTO event actually started and/or was actually completed, length of time the asset is expected to be unavailable because it is locked out and tagged out, length of time the asset was actually unavailable because it was locked out and tagged out, one or more results of the LOTO event, a change in status, if any, of the asset (locked out and/or tagged out or back in service after being locked put and tagged out), some or all of the LOTO scheduling data 342 for the event, if any, some or all LOTO data collected during the event (e.g., LOTO procedure data input by the user using a computer generated user interface), which user entered each datum of the LOTO event data (e.g., for each datum, who had logged into the machine used to input that datum), any LOTO checklist and/or LOTO procedure the user was to have followed during the event that was displayed to the user via a computer generated display (or a pointer to different data with that data stored therein), and/or other LOTO event data 44.

As still another example, in exemplary embodiments, notification data 48 on LOTO server memory 300 can include LOTO notification data 48. Exemplary LOTO notification data 348 includes for at least one notification, any one or more of the following: a LOTO notification name, a type of LOTO notification (e.g., a periodic notification or an alert), the text of the LOTO notification, the intended recipient(s) of the LOTO notification, the intended recipient(s) of the LOTO notification for whom a delivery problem occurred, the date the LOTO notification is to be sent, the date the LOTO notification was actually sent, and/or other LOTO notification data 348.

As mentioned above, each specific asset can have its own LOTO procedure and, in exemplary embodiments, LOTO scheduling data 342 and LOTO event data 344 can include a specific LOTO procedure to be followed in a scheduled LOTO event or actually followed in a LOTO event, respectively, or can include a pointer to such a LOTO procedure. Accordingly, in exemplary embodiments, LOTO server memory 300 can have stored thereon LOTO procedures data 350. LOTO procedures typically include a reference to one or more isolation points, accordingly LOTO procedures data 350 can include isolation points data 352. Exemplary LOTO procedures data 350 includes, for at least one LOTO procedure, any one or more of the following: a procedure identification code (e.g., a unique number to identify the specific procedure, which can be automatically generated or manually entered into a computer user interface and checked against a list of other codes to ensure uniqueness), a barcode number or RFID tag number or other remotely readable code uniquely identifying the LOTO procedure, the identity of the one or more person(s) who developed the LOTO procedure, the identity of the one or more person(s) who reviewed (i.e., approved) the LOTO procedure and each revision of the LOTO procedure, the level of approval for the LOTO procedure (e.g., what personnel level is required for approval), the personnel level of approval for revisions to the LOTO procedure (e.g., whether revisions must be approved and, if so, what personnel level is required for approval), identity of the one or more person(s) who revised the LOTO procedure, a name for the LOTO procedure, a description of the specific asset to which the LOTO procedure is to be applied, an identifier for the specific asset to which the LOTO procedure is to be applied, location information for the asset (e.g., building, floor, zone, etc.), the origin date, i.e., the date the LOTO procedure was originally approved, a plurality of revision numbers and corresponding revision dates, a list of warnings for the workers performing the procedure, the date when the LOTO procedure is to be audited, a list of steps to be followed in the procedure, for each step: a unique identifier of the isolation point on the LOTO procedure, e.g., a first character indicating source of energy (e.g., E for electrical, P for pneumatic, W for water, G for gas, CP for control panel, V for valve, H for hydraulic, C for chemical, or S for steam) and a unique numeric value for that isolation point in the procedure (e.g., 1 for the first isolation point of that energy source in the LOTO procedure, 2 for the second isolation point of that energy source in the LOTO procedure, etc.), and the LOTO isolation point associated with the step.

Similarly, exemplary isolation points data 352 includes, for at least one LOTO isolation point in any of the LOTO procedures data 350, any one or more of the following: a name for the isolation point, a isolation point identification code (e.g., a unique number to identify the specific procedure, which can be automatically generated or manually entered into a computer user interface and checked against a list of other codes to ensure uniqueness), a barcode number or RFID tag number or other remotely readable code uniquely identifying the isolation point, the class of worker permitted to perform the isolation of this point (e.g., electrical, pneumatic, hydraulic, water, gas, chemical, coolant, or steam), whether the isolation point requires a physical lockout device and, if so, the device that is to be used to isolate the energy (e.g., a padlock or a gate valve device), a color that can be used for the isolation device (e.g., red for electrical, blue for pneumatic, green for water, yellow for gas, brown for hydraulic, purple for chemical, orange for control panel, black for valve, or white for steam), detailed data indicating the location of that lockout point (e.g., data with one or more computer images or annotated computer images showing the lockout point, e.g., from different angles and from different distances), the method to be followed to isolate the energy, one or more steps to be taken to dissipate any stored energy, one or more check steps to ensure that the energy has been properly isolated and dissipated, one person to which this isolation point is assigned, a list of persons who are all qualified to isolate the energy at this isolation point, and/or other isolation point data 352.

LOTO server memory 300 can also have stored thereon LOTO procedures template data 354, which provides suggested LOTO procedures data for various kinds of assets, and/or isolation points template data 356, which provides suggested isolation point data for various kinds of isolation points. Exemplary systems and methods provide a user with LOTO procedures template data 354 to use as a starting point when creating LOTO procedures data 350 (i.e., adding a LOTO procedure for an asset to the LOTO server memory 300). When a user is in the process of adding a particular LOTO procedure for an asset to the LOTO server memory 300, the user can download or otherwise access LOTO procedures template data 354 for that kind of asset suggesting how some or all of the LOTO procedures data fields should be completed and all, some, or none of that asset template data need be included in the LOTO procedures data 350 saved by the user for a particular asset to the LOTO server memory 300.

Toward this end, LOTO administration logic 380 permits users to add, modify, and/or delete (depending on security permissions) LOTO procedures data 350, isolation points data 352, LOTO procedures template data 354, and/or isolation points template data 356. More specifically, in exemplary embodiments, LOTO administration logic 380 can present to the user a software user input, e.g., one or more pull-down menus or drop-down menus, one or more icons or hyperlinks, and/or one or more freeform text fields into which text can be freely typed with a computer keyboard to load, save, edit, add, modify, and/or delete (depending on security permissions) LOTO procedures data 350, isolation points data 352, LOTO procedures template data 354, and isolation points template data 356. If LOTO procedures template data 354 or isolation points template data 356 is available, or if saved LOTO procedures data 350 or isolation points data 352, LOTO administration logic 380 can present to the user a software user input, e.g., one or more pull-down menus and/or one or more icons, with which the user can cause the administration logic 80 to load any of that template data 354, 356 or saved data as part of creating LOTO procedures data 350 and/or isolation points data 352.

The different logic described in the context of the embodiments of FIGS. 1-5 and 6-7 can be modified to perform their respective functions with the LOTO data 334, 342, 344, 348, 350, 352, 354, 356 described above, e.g., remote data logic 54, 54' can be modified to cause one or more circuits, e.g., one or more processors, to provide any of the foregoing LOTO data 334, 342, 344, 348, 348, 350, 352, 354, 356 to the one or more local or remote administrative computers 14 and computers of the plurality of local or remote user computers 16 in response to requests for such LOTO data by software executing on the computers 14, 16; offline device logic 56, 56' can be modified to cause one or more circuits, e.g., one or more processors, to interact with computers 14, 16 and temporarily transfer data thereto to permit the computers 14, 16 to perform activities with any of the LOTO data mentioned above, e.g., LOTO data 334, 342, 344, 348, 348, 350, 352, 354, 356; and search logic 58, 58' can be modified to cause one or more circuits, e.g., one or more processors, to receive queries about LOTO data 334, 342, 344, 348, 348, 350, 352, 354, 356 and to search for and present the results of queries of any of the data 334, 342, 344, 348, 348, 350, 352, 354, 356 to which the corresponding user has access.

As another example, notification logic 50 can cause one or more circuits, e.g., one or more processors, to generate and transmit LOTO notifications to one or more users in accordance with LOTO notification data 48 and other data. For example, as a user schedules a LOTO event, asset data 30, personnel data 334, LOTO scheduling data 342, LOTO event data 344, LOTO notification data 348, LOTO procedures data 350, isolation points data 352, LOTO procedures template data 354, and/or isolation points template data 356 might indicate that one or more LOTO notifications are to be sent or queued for later sending. LOTO notifications can be any one or more different types of direct notifications, such as texts, e-mails, and/or automated phone calls presenting audio messages by playing back pre-recorded audio data files stored on one or more data storage devices, e.g., audio files stored on LOTO server 300. LOTO notifications can also take the form of indirect notifications by interactions with other software, i.e., sending a message to the other software, which displays the LOTO notification to the user using its own display, such as (a) sending for display the text of a pop-up LOTO notification to a computer such as a handheld computer (e.g., computer 14, 16), a laptop computer (e.g., computer 14, 16), a desktop computer (e.g., computer 14, 16), or a special purpose computer (e.g., a wireless printer, computer 14, 16 or RFID reader 110 in the '911 application), (b) sending a calendar message to cause integral or 3rd party calendar software to enter a scheduled LOTO event entry on an electronic calendar of the recipient, (c) sending a LOTO event message to integral or 3rd party workflow software (e.g., sending a LOTO event message to SAP brand enterprise resource planning software via its API or to MAXIMO brand enterprise resource planning software via its API), and/or (d) sending a LOTO event message to be collected with other messages (e.g., sending a message to an iOS device to be collected with other messages on the pull-down iOS Notification Center screen), etc. For example, if an asset is scheduled to be locked out and tagged out, the LOTO notification logic 50 might (a) directly send an e-mail notification about the scheduled LOTO event to one or more users of the asset who are flagged to receive notifications about that particular assert, and/or (b) directly send or queue for later direct sending a LOTO notification that the LOTO event has been scheduled to be performed by that worker, such as in a daily e-mail to the worker indicating the tasks for that day to be performed by that worker, and/or (c) send a calendar LOTO event corresponding to the scheduled LOTO to the worker's work calendar software. In exemplary embodiments, LOTO personnel data 334 can indicate which notifications are to be sent to each person and in which format(s), i.e., can indicate which persons are subscribers of which LOTO notifications and the manner(s) of delivery. Similarly, in exemplary embodiments, administration logic 80 can present to the user a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which administrative personnel or other users can select which LOTO notifications are to be sent to each person and in which format(s), i.e., can indicate which persons are subscribers of which LOTO notifications and the manner(s) of delivery (depending on permissions).

Systems and Methods for Approving a Procedure

In exemplary embodiments, computer implemented methods are provided to approve a procedure or other event. In exemplary embodiments, an exemplary computer implemented method for facilitating approval of a procedure comprises providing a computer user interface with which a user can author a proposed procedure, providing a computer user interface with which a user can indicate that the proposed procedure is ready for approval, displaying on an electronic display the proposed procedure for approval automatically in response to the proposed procedure requiring approval, accepting with a computer user interface approval data for the proposed procedure, and storing the proposed procedure as an approved procedure on a server. The procedure can be a LOTO procedure or an inspection checklist or some other procedure. If the proposed procedure does not require approval, the computer implemented method will skip displaying on an electronic display the proposed procedure for approval and will automatically store the proposed procedure as an approved procedure on a server for use. In exemplary embodiments, memories 22, 22', 72, and 300 include logic to cause the processor(s) of the various systems herein to perform the above functions and processes. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Figure 9:
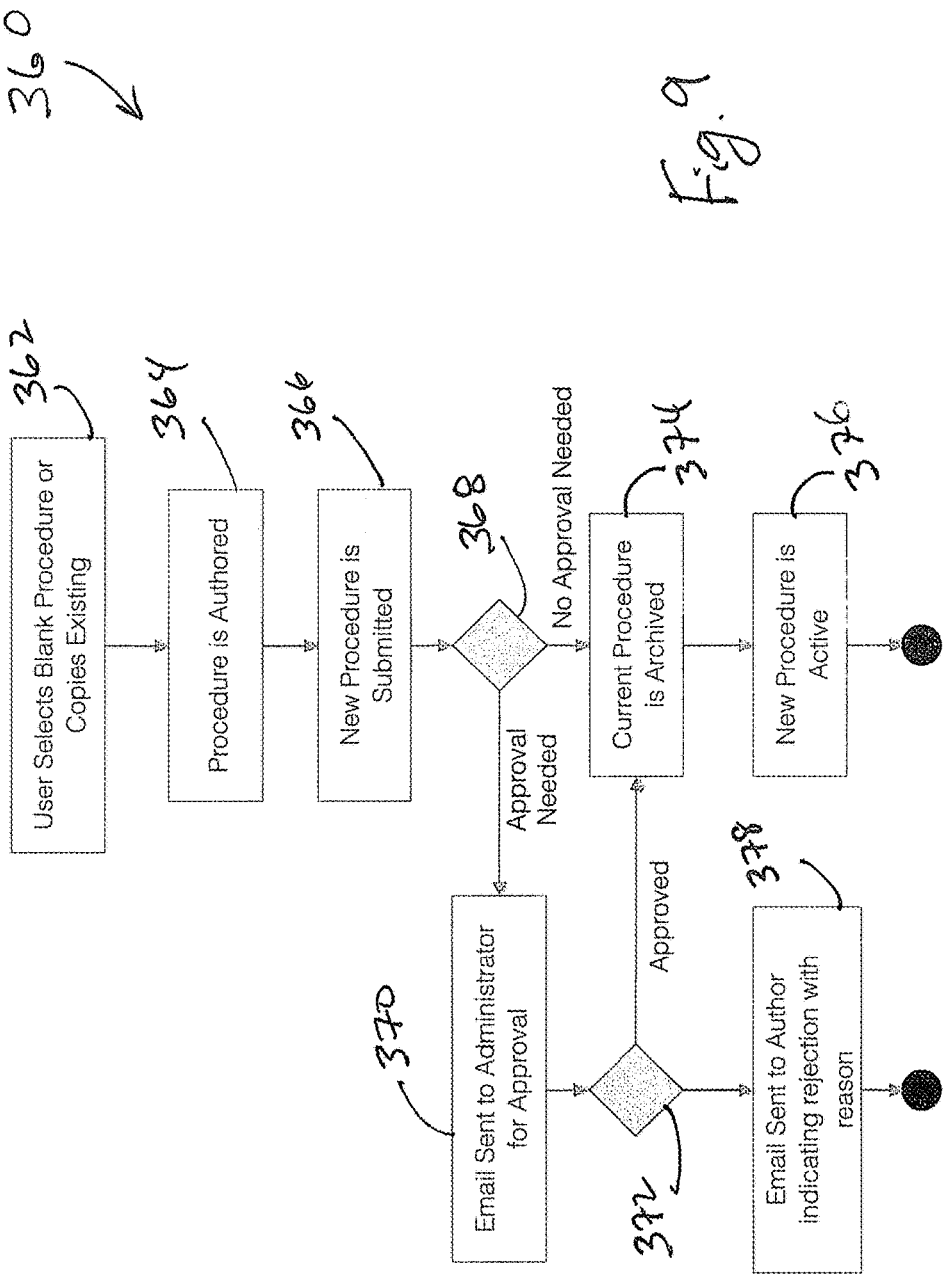
FIG. 9 is a flow chart showing an exemplary method of approving a procedure.

Referring again to the drawings, FIG. 9 is a flow chart showing an exemplary method 360 of approving a procedure. A user (an author of the procedure in this method) logs in and commands the system to begin the process of adding and approving a procedure, e.g., by selecting a menu item or by activating an icon or with some other computer user interface. In response, the system, in exemplary embodiments, presents to the user a software user input, e.g., one or more pull-down menus or drop-down menus, one or more icons or hyperlinks, and/or one or more freeform text fields into which text can be freely typed with a computer keyboard, with which the user can select a blank procedure of the type being authored or to load from memory a procedure template of the type being authored or load from memory a previously saved procedure template of the type being authored. Then the author uses a presented software user input, e.g., one or more pull-down menus or drop-down menus, one or more icons or hyperlinks, and/or one or more freeform text fields into which text can be freely typed with a computer keyboard, with which the user can author a proposed procedure by adding, editing, or deleting portions of the proposed procedure and save the proposed procedure, at 364. At 366, the author indicates to the system that the proposed procedure is ready for approval by actuating a corresponding software user input, e.g., one or more pull-down menus or one or more icons. In response, the system determines, at 368, whether the proposed procedure requires approval, e.g., by reading procedure data (e.g., LOTO procedures data 350 for that LOTO procedure or a similar LOTO procedure). For example, some workers (e.g., recently trained workers, as identified by LOTO personnel data 334) might have to have virtually all of their LOTO procedures separately approved by another, e.g., a foreman or other supervisor. As another example, some assets might be so important, e.g., plant-wide safety assets, that separate authorization is always required, no matter who is creating or modifying the LOTO procedure. As yet another example, some isolation points might be of a nature that separate authorization is always required, no matter who is creating or modifying the isolation point step in any LOTO procedure. If the proposed procedure does require approval, the system displays to authorization personnel, e.g., at administrator, on an electronic display the proposed procedure for approval. For example, as indicated in FIG. 9, the system can automatically notify the administrator, e.g., by sending an e-mail to the administrator a notification, that the proposed procedure has been authored and is awaiting approval. The administrator (or other authorization personnel) indicates to the system that the proposed procedure is approved or not approved by actuating a corresponding software user input, e.g., one or more pull-down menus or one or more icons. Thus, the system accepts with the computer user interface approval data for the proposed procedure. If the proposed procedure has been approved, at 372, the system archives the current procedure (if any), at 374, and stores the proposed procedure as an approved procedure, at 376, on a server or other data storage device(s), e.g., one of memories 22, 22', 72, and 300. If the proposed procedure requires approval but does not receive approval, at 372, the system will notify the author of the proposed procure using any of the various notification systems and methods discussed above in connection with the notification logic 50 using any one or more direct or indirect notifications discussed above, e.g., by sending a text or an e-mail to the author, at 378. The computer user interface can also provide one or more software user inputs, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which the authorization personnel indicate one or more reasons why the proposed procedure was not approved, which additional data can be stored to memory 22, 22', 72, 300. If the proposed procedure does not require approval, at 368, the system skips the approval steps 370, 372 and will automatically store the proposed procedure as an approved procedure to memory 22, 22', 72, 300 for use. The procedure can be a LOTO procedure or an inspection checklist or some other procedure. In exemplary embodiments, memories 22, 22', 72, and 300 include logic to cause the processor(s) of the various systems herein to perform the above functions and processes. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Systems and Methods for Assigning a Procedure

In exemplary embodiments, computer implemented methods are provided to assign a procedure or other event. In exemplary embodiments, an exemplary computer implemented method for facilitating approval of a procedure comprises storing a plurality of procedures on at least one data storage device; storing personnel data related to a plurality of workers on at least one data storage device, the personnel data including data indicating at least which portions of procedures that each worker of the plurality of workers is permitted to perform; providing a computer user interface with which a user can select a procedure from the plurality of procedures on the data storage device; and automatically with a computer accessing personnel data related to a worker assigned to perform at least one portion of the selected procedure and automatically with a computer determining whether the worker assigned to perform the at least one portion of the selected procedure is authorized to perform the at least one portion of the selected procedure by comparing at least some of the accessed personnel data to at least some data associated with the selected procedure. In exemplary embodiments using worker classes for the procedure, an exemplary computer implemented method for facilitating approval of a procedure comprises storing a plurality of procedures on at least one data storage device; storing personnel data related to a plurality of workers on at least one data storage device, the personnel data including data indicating at least which portions of procedures that each worker of the plurality of workers is permitted to perform; providing a computer user interface with which a user can select a procedure from the plurality of procedures on the at least one data storage device; providing a computer user interface with which a user can select at least one worker to perform at least one portion of the selected procedure; and automatically with a computer accessing personnel data stored on the at least one data storage device related to the at least one worker assigned to perform the at least one portion of the selected procedure and automatically with a computer determining whether the at least one worker assigned to perform the at least one portion of the selected procedure is authorized to perform the at least one portion of the selected procedure by comparing at least some of the accessed personnel data to at least some data associated with the selected procedure. In exemplary embodiments using worker classes for each step in the procedure, an exemplary computer implemented method for facilitating approval of a procedure comprises storing a plurality of procedures on at least one data storage device, each procedure comprising a plurality of steps; storing personnel data related to a plurality of workers on at least one data storage device, the personnel data including data indicating which procedure steps that each worker of the plurality of workers is permitted to perform; providing a computer user interface with which a user can select a procedure from the plurality of procedures on the data storage device; providing a computer user interface with which a user can select a step of the selected procedure; providing a computer user interface with which a user can select at least one worker to perform the selected step of the selected procedure; and automatically with a computer accessing personnel data related to the at least one worker assigned to perform the step of the selected procedure and automatically with a computer determining whether the at least one worker assigned to perform the selected step of the selected procedure is authorized to perform the selected step of the selected procedure by comparing at least some of the accessed personnel data to at least some data associated with the selected procedure. The above procedures can be LOTO procedures or inspection checklists or some other procedures. In exemplary embodiments, memories 22, 22', 72, and 300 include logic to cause the processor(s) of the various systems herein to perform the above functions and processes. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Figure 10:
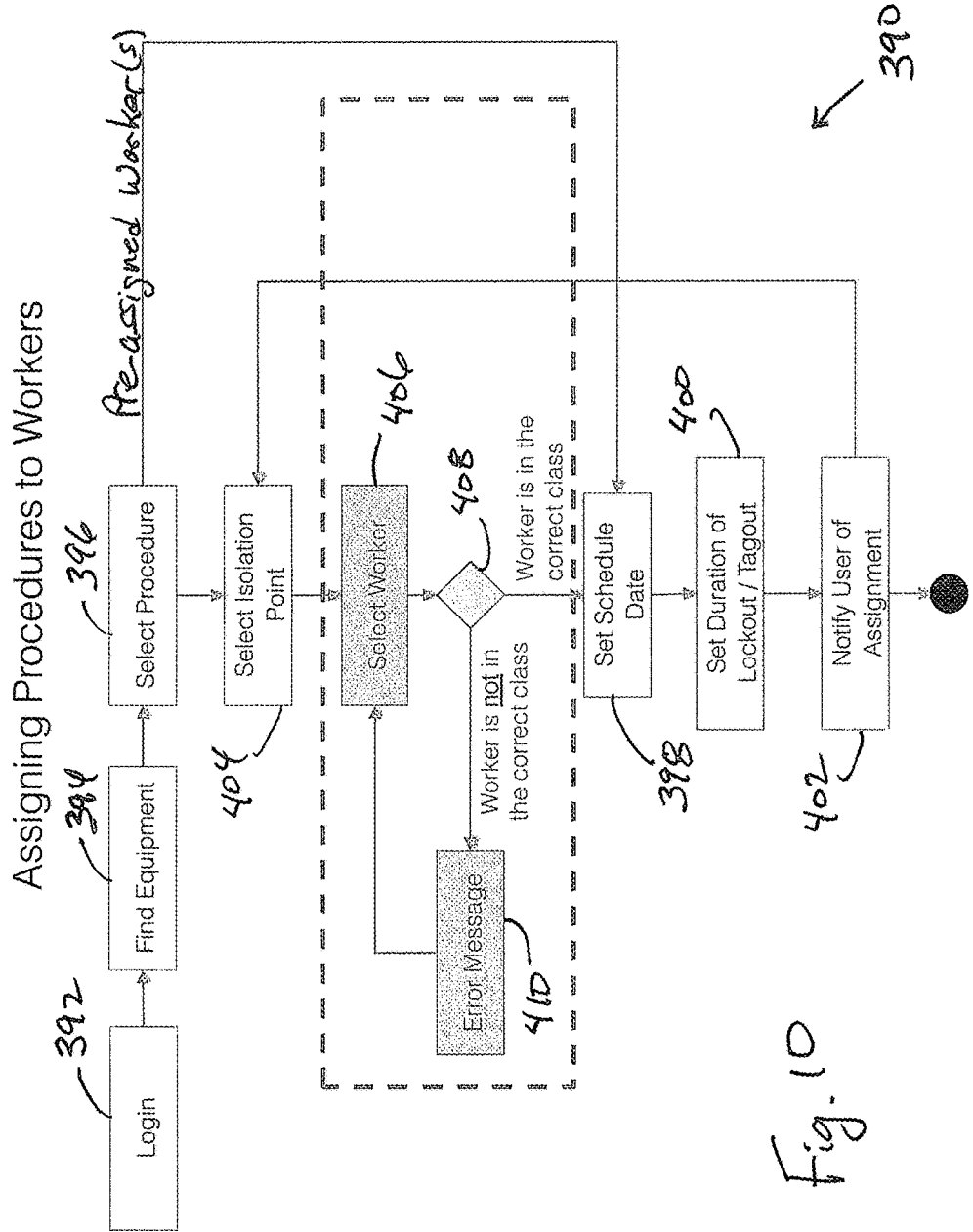
FIG. 10 is a flow chart showing an exemplary method of assigning a procedure.

Referring to the drawings, FIG. 10 is a flow chart showing an exemplary method 390 of assigning a procedure. A user (e.g., a worker or administrator) logs in at 392 and commands the system to begin the process of assigning a procedure, e.g., by selecting a menu item or by activating an icon or with some other computer user interface. In response, the system, in exemplary embodiments, presents to the user a software user input, e.g., one or more pull-down menus or drop-down menus, one or more icons or hyperlinks, and/or one or more freeform text fields into which text can be freely typed with a computer keyboard, with which the user can select an asset, select a procedure for the asset, and assign one or more workers to the procedure. The user uses the presented software user input to find a piece of equipment at 394, e.g., select an asset type from a pull-down or drop-down menu presenting a plurality of asset types and executing search logic 58 to pull up assets meeting the search criteria and selecting a single asset. Then, at 396, the user uses a presented software user input, e.g., one or more pull-down menus or drop-down menus, one or more icons or hyperlinks, and/or one or more freeform text fields into which text can be freely typed with a computer keyboard, with which the user can select a procedure to be applied to the asset, e.g., an inspection of the assert or a LOTO procedure for the asset.

If the selected procedure has one pre-assigned worker, or a plurality of pre-assigned workers, as determined by logic that accesses and analyzes procedures data, e.g., LOTO procedures data 350 and/or isolation points data 352, the user then schedules a date for the procedure using scheduling logic 86, at 398, which is saved as scheduling data 42. Additionally, at 400, the user uses a presented software user input, e.g., one or more pull-down menus or drop-down menus, one or more icons or hyperlinks, and/or one or more freeform text fields into which text can be freely typed with a computer keyboard, with which the user can input data indicating how long the asset is expected to be effected by the procedure, e.g., a number of hours or days or weeks or some other data, e.g., a date in the future by which time the user expects the asset to no longer be affected by the procedure. The foregoing data can be saved to a memory 22, 22', 72, 300. At 402, the system notifies various persons affected by the procedure or otherwise related to the procedure using any of the various notification systems and methods discussed above in connection with the notification logic 50 using any one or more direct or indirect notifications to subscribers discussed above, e.g., a text or an e-mail, a notification via calendar entries, and/or notification via internal or 3rd party workflow software. For example, In exemplary embodiments, workers are subscribers of notifications affecting assets assigned to them and assets they use, e.g., In exemplary embodiments, workers using a large machine for their day-to-day work will subscribe to notifications when a procedure affecting that machine is scheduled, such as an inspection or a LOTO procedure. As another example, In exemplary embodiments, workers are subscribers of notifications of procedures they are expected to perform in part or in their entireties. In exemplary embodiments, the notification(s) include any or all of the scheduling data 42, e.g., LOTO scheduling data 342, and data about the procedure not included in the scheduling data 42, e.g., LOTO procedures data and isolation points data 352.

The computer user interface also provides one or more software user inputs, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which the user can select one or more workers for a procedure or individual steps of a procedure. For example, if the user must select a worker for the selected procedure, at 404, the user selects with the software user input a step of the procedure, e.g., an isolation point of a LOTO procedure. This data is saved. Then, at 406, the user selects with the software user input a worker or workers to perform the selected step of the procedure, e.g., selects one or more workers to isolate a selected isolation point of a LOTO procedure. This data is saved. Then the system checks whether the selected worker(s) may perform the selected step of the procedure by accessing and comparing personnel data and data about the procedure. For example, if the procedure is a LOTO procedure, the system will access LOTO personnel data 334 and LOTO procedures data 350, including isolation points data 352, to confirm that the selected worker(s) are permitted to work on the type of energy for the selected isolation point. If not, the system displays an error message on an electronic display, at 410, and permits the user to select other individuals, at 406. In the alternative, the LOTO personnel data 334 and LOTO procedures data 350, including isolation points data 352, can be accessed by the system responsive to selection of an isolation point and the user is presented in the software user input, e.g., a pull-down or drop-down menu, only those workers who are permitted to work on the selected isolation point. If at 408 the selected worker(s) are permitted to work on the type of energy for the selected isolation point, the system continues at 398, 400, and 402, discussed above. The procedure loops back to 404 if there are remaining steps of the procedure, e.g., remaining isolation points of a LOTO procedure, to assign workers.

As mentioned above, the procedure of method 390 can be a LOTO procedure or an inspection checklist or some other procedure. In exemplary embodiments, memories 22, 22', 72, and 300 (with or without the systems and methods discussed in connection with FIG. 9) include logic to cause the processor(s) of the various systems associated with FIG. 10 to perform the above functions and processes. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Systems and Methods for Completing an Isolation Point on a Procedure

Figure 11:
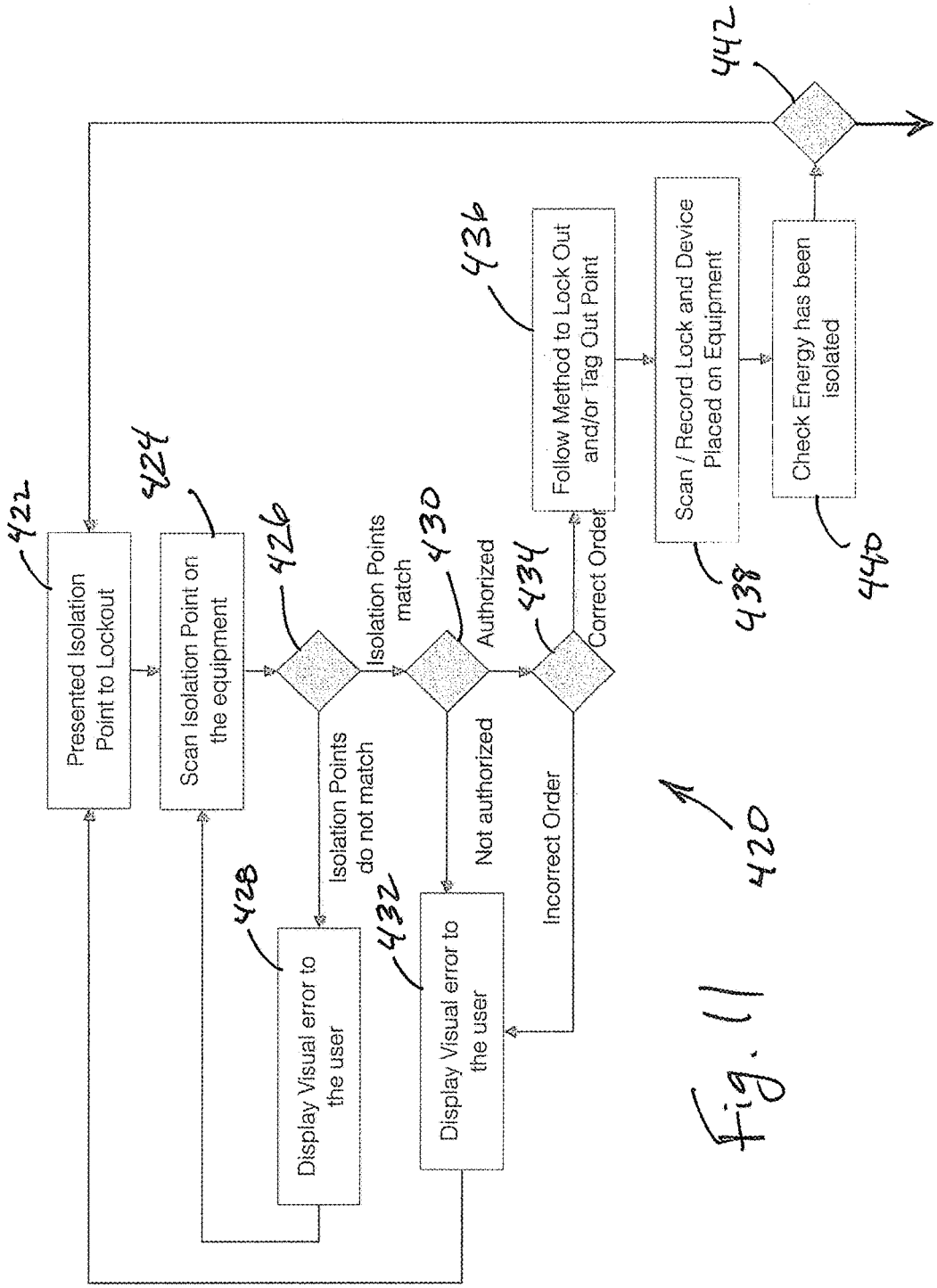
FIG. 11 is a flow chart showing an exemplary method of completing an isolation point on a LOTO procedure.

Referring to the drawings, FIG. 11 is a flow chart showing an exemplary method 420 of completing an isolation point on a LOTO procedure. In exemplary embodiments, a worker uses a portable computer, e.g., a hand held computer, while performing the method of FIG. 11. In exemplary embodiments, a worker uses a computer in the form of an RFID reader 110 shown and described in the '911 Application. In other exemplary embodiments, the worker user uses a computer in the form of a so-called smart phone or tablet computer (e.g., computer 14, 16) programmed with logic shown herein, e.g., running an app with logic shown in the '911 Application and logic shown herein. In exemplary embodiments, the worker will have logged in and used offline device logic 56, 56' to download to the computer the data needed for the isolation point or the entire LOTO procedure before leaving an area with communications with the server 22, 22'. The worker commands the system to begin the LOTO procedure, e.g., by selecting a menu item or by activating an icon or with some other computer user interface. In exemplary embodiments, the worker can begin the LOTO procedure by scanning a tag associated with the LOTO procedure, e.g., scans an RFID tag to read the RFID value for the LOTO procedure, scans a barcode to read the bar code value for the LOTO procedure, or scans some other tag associated with the LOTO procedure (e.g., a bump technology tag, an NFC technology tag, a WiFi tag, a Bluetooth technology tag, etc.) to read a corresponding value for the LOTO procedure (these tags can be physically located at a LOTO lockout station, e.g., a lockout station 112 as shown and described in the '911 Application). In exemplary embodiments, this scan associated with the LOTO procedure commands the processor in the computer to either begin the LOTO procedure or pull up a display of the LOTO procedure and present a software use input, e.g., an icon, with which the worker can select to begin the procedure. In response, the system, presents to the worker on an electronic display of the computer a display indicating the identity and location of the first isolation point, at 422, which can include a prompt to the worker to scan the isolation point and present any of the isolation points data 352 for that isolation point, including a description of the isolation point, the location of the isolation point, and one or more images of the isolation point. Once at the isolation point, the worker scans the isolation point, e.g., scans an RFID tag to read the RFID value for the isolation point, scans a barcode to read the bar code value for the isolation point, or scans some other tag at the isolation point to read a corresponding value for the isolation point, at 424. In exemplary embodiments, as each tag is scanned (or otherwise input), the system notifies various persons affected by the procedure or otherwise related to the procedure using any of the various notification systems and methods discussed above in connection with the notification logic 50 using any one or more direct or indirect notifications to subscribers discussed above, e.g., a text or an e-mail and/or notification via internal or 3rd party workflow software.

At 426, the computer compares the identity of the scanned isolation point to the identity of the isolation point that is first or next in the LOTO procedure. If the scanned isolation point does not match, the computer displays an error message, at 428, and the computer re-displays the data about the isolation point and again prompts the worker to scan the isolation point. If at 426 the isolation point matches the current isolation point in the system, the computer next determines, at 430, whether the worker who logged in is permitted to isolate the energy type for this particular isolation point by accessing LOTO personnel data 334 and LOTO procedures data 350, including isolation points data 352 for this isolation point, to confirm that the worker who logged into the computer is permitted to work on the type of energy for the selected isolation point. If not, the system displays an error message on an electronic display, at 432, e.g., a message indicating that the worker who logged into the computer is not permitted to work on the type of energy for the selected isolation point. If another worker has already been selected for this particular isolation point, the message displayed at 432 can include the identity of the worker the system expects to scan and work on that isolation point. If, at 430, the computer determines that the worker who logged into the computer is permitted to work on the type of energy for the selected isolation point, the computer next checks to determine if the isolation points were scanned in the correct order, at 434. For example, if a plurality of isolation point tags were quickly scanned in succession, the system would perform steps 426 and 430 on the first isolation point that was scanned. However, even if the first isolation point scanned matches the expected isolation point, and even if the worker who logged in is permitted to work on all the scanned isolation points, the computer will still check to be sure they were all scanned in the correct order. If not, the computer displays an error message, at 432. For example, in exemplary embodiments, an event can be performed in any order of steps. In this case, there is a secondary check to help ensure that the isolation points are isolated in the order recited in the approved LOTO procedure. Next, at 436, the worker follows the method for that isolation point to lock out and/or tag out the isolation point. In exemplary embodiments, the computer displays data for the method for isolating that isolation point on its electronic display, i.e., displays the method and any other of the LOTO procedures data 352 for that isolation, e.g., some or all of the isolation points data 352 for that isolation point. The worker can lock out and tag out the isolation point using any of the various systems and methods in the '911 Application and/or the '935 Application, e.g., using any of the LOTO locks and/or LOTO tags disclosed in the '911 Application and/or the '935 Application. At 438, the worker scans or otherwise records the identity of the locks, devices, and tags placed on the asset. The computer will store as LOTO event data 344 the precise time that each lock, device, and tag is scanned in accordance with those applications. If ordinary (non-tagged, non-processor) LOTO locks, devices, and tags are being used, the computer can provide one or more software user inputs, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which the worker can manually enter data corresponding to the identity of the locks, devices, and tags as they are applied. Next, at 440, the worker checks to be sure the energy at that isolation point has been properly isolated. In exemplary embodiments, the computer displays data for the check step for that isolation point on its electronic display, i.e., displays the check steps and any other of the LOTO procedures data 352 for that isolation, e.g., some or all of the isolation points data 352 for that isolation point. Next, at 442, the computer checks to determine whether any additional approval is needed for the manner in which this isolation point has been isolated. For example, some workers (e.g., recently trained workers, as identified by LOTO personnel data 334) might have to have virtually all of their isolation points separately approved by another, e.g., a foreman or other supervisor. As another example, some assets might be so important, e.g., plant-wide safety assets, that separate authorization is always required, no matter who is isolating the energy at that isolation point. If approval is needed, logic in the computer can accept the approval to finalize that isolation point. In exemplary embodiments, if data indicates that approval is needed, the computer presents a software user input, e.g., locations for a foreman or other supervisor to type in a username and password to indicate approval. Additionally, if approval is needed, in exemplary embodiments, the system notifies approval personnel using any of the various notification systems and methods discussed above in connection with the notification logic 50 using any one or more direct or indirect notifications to subscribers discussed above, e.g., a text or an e-mail and/or notification via internal or 3rd party workflow software. If approval is needed and no approval is provided, the isolation point remains incomplete in the system.

As each isolation point is completed, in exemplary embodiments, the system notifies various persons affected by the procedure or otherwise related to the procedure using any of the various notification systems and methods discussed above in connection with the notification logic 50 using any one or more direct or indirect notifications to subscribers discussed above, e.g., a text or an e-mail and/or notification via internal or 3rd party workflow software. For example, in exemplary embodiments, workers are subscribers of notifications steps of LOTO procedures before an isolation point assigned to them, so that when the previous isolation point is complete, the worker knows that the worker can attend to the next isolation point, which is assigned to the worker. The process of FIG. 11 repeats starting again at 422 until all isolation points in the LOTO procedure have been isolated and checked.

In exemplary embodiments, memories 22, 22', 72, and 300 (with or without systems and methods discussed in connection with either or both of FIGS. 9-10) include logic to cause the processor(s) of the various systems herein to perform the above functions and processes associated with FIG. 11, including the corresponding logic of the '911 Application and/or the '935 Application. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes, including the corresponding logic of the '911 Application and/or the '935 Application.

Systems and Methods Showing Progress of a LOTO Procedure

In exemplary embodiments, computer implemented methods are provided to display to others the progress of a procedure or other event. In exemplary embodiments, an exemplary computer implemented method for displaying the progress of a procedure comprises accepting data indicating that one or more steps in a procedure have been completed and displaying on an electronic display the sequential completion of the various steps in the procedure. As sequential steps in the procedure or other event are completed, as indicated by data on the system, the display is updated correspondingly. The procedure can be a LOTO procedure or an inspection checklist or some other procedure. The data indicating that one or more steps in a procedure have been completed can be entered using any of the systems and methods associated with FIG. 11, including applicable portions of the systems and methods in the '911 Application and/or the '935 Application. The data can be displayed on an electronic display to anyone with appropriate permissions, e.g., anyone who is subscribed to receive notifications about the asset to which the procedure or other event is being applied. In exemplary embodiments, memories 22, 22', 72, and 300 include logic to cause the processor(s) of the various systems herein to perform the above functions and processes. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Figure 12:
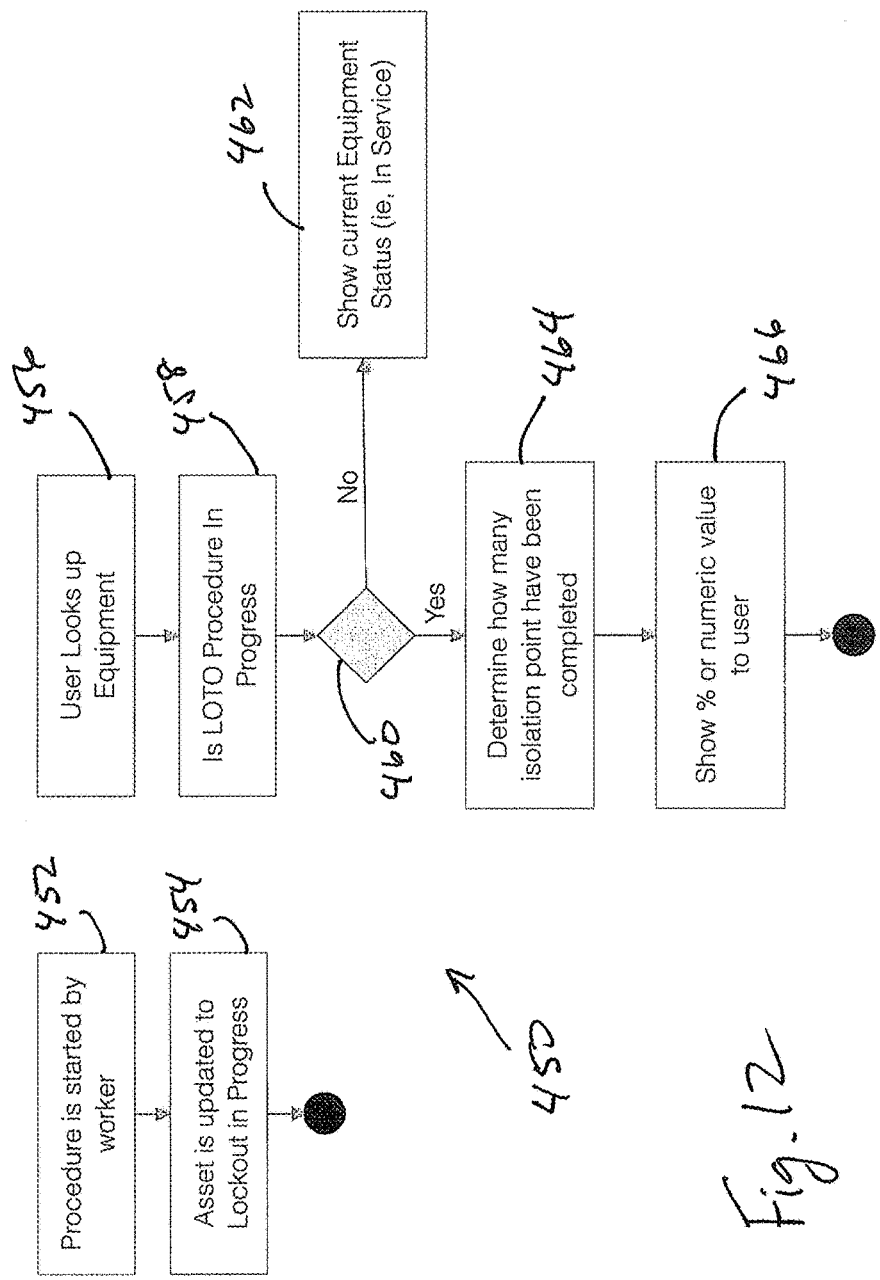
FIG. 12 is a flow chart showing an exemplary method display to others the progress of a procedure or other event.

Referring to the drawings, FIG. 12 is a flow chart showing an exemplary method 450 of displaying to others the progress of a LOTO procedure or other event. Referring to the left portion of FIG. 12, a worker logs in and begins the process of locking out and tagging out an asset, at 452. In exemplary embodiments, this is done in accordance with FIG. 11 and the accompanying text and/or in accordance with systems and methods in the '911 Application and/or the '935 Application. As steps of the LOTO procedure are sequentially completed, i.e., isolation points are sequentially isolated, at 454, as indicated by LOTO event data 344 on the system (e.g., memories 22, 22', 72, and 300), the display is updated correspondingly. Turning to the right portion of FIG. 12, a user logs in and searches for an asset using search logic 58, e.g., by selecting a menu item or by activating an icon or with some other computer user interface, and the system displays on an electronic display data relating to the asset. If a LOTO procedure or other event affecting the asset is not in progress, as determined by the system at 460, the display of data can simply indicate that the asset is in service. If, however, a LOTO procedure or other event affecting the asset is in progress, as determined by the system at 460, the display of data can indicate the one or more events in progress, e.g., by displaying a statement such as "Asset is being Locked out and Tagged out" and/or "Asset is being inspected." The system, at 464, can access LOTO procedures data 350, including isolation points data 352, for the LOTO procedure in progress, and determine how many isolation points have been completed and how many total isolation points must be isolated in this LOTO procedure, and display an indication, at 466, of how far the LOTO procedure has progressed as compared to the procedure as a whole, e.g., the LOTO is XX % complete or nn isolation points of mm total isolation points have been isolated. The user requests that the system display details about the progress of an event in progress, e.g., by selecting a menu item or by activating an icon or with some other computer user interface, e.g., by touching or clicking on the display of XX % complete or nn isolation points of mm total isolation points. In exemplary embodiments, memories 22, 22', 72, and 300 (with or without the systems and methods discussed in connection with any one or more of FIG. 9, FIG. 10, and FIG. 11) include logic to cause the processor(s) of the various systems herein to perform the above functions and processes associated with FIG. 12. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Systems and Methods for Printing a Procedure

Figure 13:
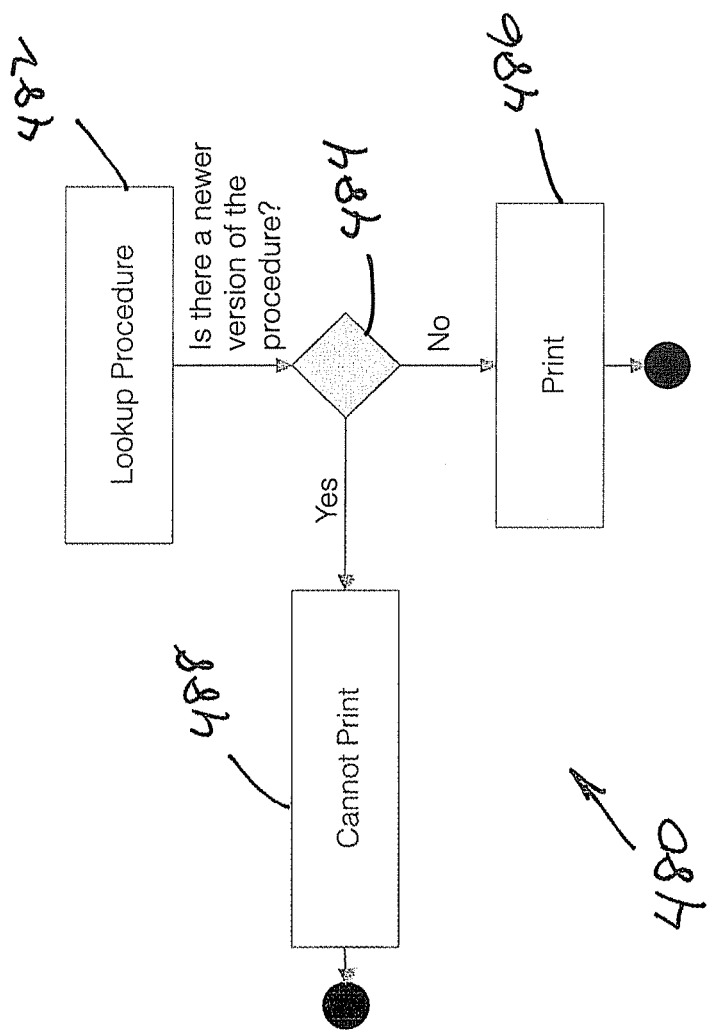
FIG. 13 is a flow chart showing an exemplary method of printing a procedure or other event.

Referring to the drawings, FIG. 13 is a flow chart showing an exemplary method 480 of printing a LOTO procedure or other event. Referring to FIG. 13, a user logs in and searches for a procedure or other event using search logic 58, e.g., by selecting a menu item or by activating an icon or with some other computer user interface, at 482, and the system displays on an electronic display data relating to the procedure or other event. The user causes the system to print a copy of the procedure or other event, e.g., by selecting a menu item or by activating an icon or with some other computer user interface, e.g., by touching or clicking on a print icon. In exemplary embodiments, the system accesses event data 44, LOTO event data, LOTO procedures data 350, and/or isolation points data 352, as appropriate, to determine whether a newer version of the LOTO procedure, or other procedure or other event, saved to the system memory, at 484. If no newer version of the LOTO procedure, or other procedure or other event, is saved to the system memory, the system prints a copy of the LOTO procedure, or other procedure or other event. If there is a newer version of the LOTO procedure, or other procedure or other event, saved to the system memory, in exemplary embodiments, the system does not print a copy of the LOTO procedure, or other procedure or other event, at 488. In other exemplary embodiments, the system will print a copy of the LOTO procedure, or other procedure or other event; however, the system will boldly indicate that the LOTO procedure, or other procedure or other event is not the most current version, e.g., by a large watermark overprinted over the printout (such as "Obsolete—For Reference Only" or the like). In exemplary embodiments, memories 22, 22', 72, and 300 (with or without the systems and methods discussed in connection with any one or more of FIG. 9, FIG. 10, FIG. 11, and FIG. 12) include logic to cause the processor(s) of the various systems herein to perform the above functions and processes associated with FIG. 13. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Systems and Methods for Assigning Users to Worker Classes

Figure 14:
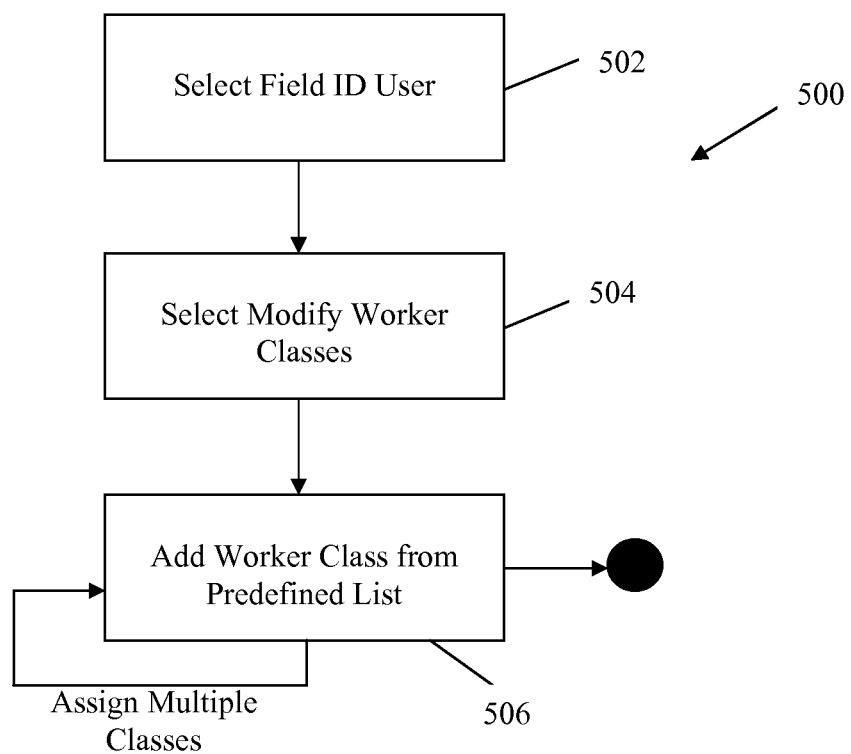
FIG. 14 is a flow chart showing an exemplary method of assigning workers to worker classes.

Referring to the drawings, FIG. 14 is a flow chart showing an exemplary method 500 of assigning workers to worker classes for performing all or subsets of a procedure or another event. Referring to FIG. 14, a user logs in and searches for a worker using search logic 58, e.g., by selecting a menu item or by activating an icon or with some other computer user interface, at 502, and the system displays on an electronic display data relating to the worker. The user causes the system to add, modify, or delete worker classes applicable to that worker, e.g., by selecting a menu item or by activating an icon or with some other computer user interface, at 504. In exemplary embodiments, the system presents to the user a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which the user can assign one or more predetermined worker classes to that worker, and save the assigned classes as personnel data 34, e.g., LOTO personnel data 334. For example, if a new worker is hired and it is determined that the worker is capable of isolating electrical and gas LOTO isolation points, and only those, the user can select radio buttons or other software user inputs, corresponding to electrical and gas LOTO isolation points, and de-select other types of isolation points, and then select an icon or other software user input, to cause the system to save that data as LOTO personnel data 334 for that worker. In exemplary embodiments, memories 22, 22', 72, and 300 (with or without the systems and methods discussed in connection with any one or more of FIG. 9, FIG. 10, FIG. 11, FIG. 12, and FIG. 13) include logic to cause the processor(s) of the various systems herein to perform the above functions and processes associated with FIG. 14. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Systems and Methods of Creating a Marketplace for Event Data

In exemplary embodiments, computer implemented methods are provided to create a marketplace for event data, e.g., inspection checklists, LOTO procedures, anonymous data about results of inspections of assets, data about who owns which assets, etc. In exemplary embodiments, an exemplary computer implemented method for facilitating approval of a procedure comprises offering event data, such as inspection checklists, LOTO procedures, anonymous data about results of inspections of assets, data about who owns which assets, to be purchases or licensed for consideration, accepting consideration for one or more sets of event data, such as one or more inspection checklists, one or more LOTO procedures, one or more lists of anonymous data about results of inspections of assets, and/or one or more lists of which companies own which assets; and electronically delivering the one or more sets of event data, such as one or more inspection checklists, one or more LOTO procedures, one or more lists of anonymous data about results of inspections of assets, and/or one or more lists of which companies own which assets. In exemplary embodiments, memories 22, 22', 72, and 300 include logic to cause the processor(s) of the various systems herein to perform the above functions and processes. Accordingly, in exemplary embodiments, a data storage device having a non-transitory machine-readable medium has stored instructions (e.g., computer executable instructions or instructions interpreted to generate computer executable instructions) that cause one or more processors to perform the above functions and processes.

Figure 15:
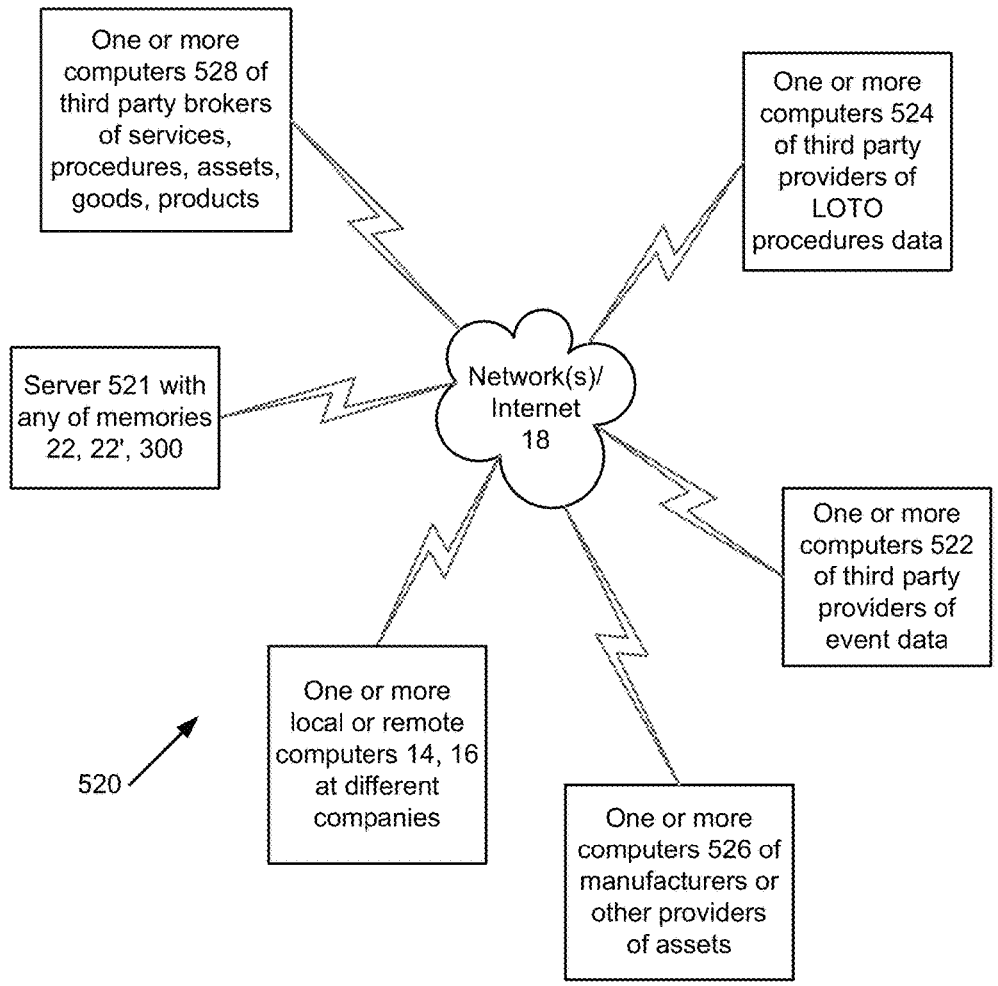
FIG. 15 is a block diagram showing an exemplary system creating a marketplace for event data, such as inspection checklists and LOTO procedures.

Referring to the drawings, FIG. 15 is a block diagram showing an exemplary system 520 creating a marketplace for event data. Exemplary system 520 includes a computer server 521 in the configuration of FIG. 2 and having any of memories 22, 22', 72, and 300 (with or without the additional systems and methods discussed in connection with any one or more of FIG. 9, FIG. 10, FIG. 11, FIG. 12, FIG. 13, and/or FIG. 14) in communication with one or more local or remote administrative computers 14, a plurality of local or remote user computers 16, and some or all of: one or more computers 522 of one or more third party providers of event data 44, and/or one or more computers 524 of third party providers of LOTO event data 344, such as LOTO procedures data 352 and isolation points data 352, and/or one or more computers 526 of manufacturers or other providers of assets, and/or one or more computers 528 of third party brokers of services, procedures, assets, goods, products via one or more wired or wireless communication networks 18, e.g., the Internet. The computers 14, 16, 110 (in the '911 Application), 114 (in the '911 Application), 116 (in the '911 Application) 521, 522, 524, 526, 528 have logic stored in one or more data storage devices to cause their respective processor(s) to create a marketplace for event data 44, such as inspection checklists and LOTO procedures. For example, the server 521 can have logic acting as a server to client requests from client computers 14, 16, 522, 524, 526, 528. In exemplary embodiments, the computers 14, 16, 110 (in the '911 Application), 114 (in the '911 Application), 116 (in the '911 Application) 521, 522, 524, 526, 528 have logic stored in one or more data storage devices to cause their respective processor(s) to do any one or more of the following:

A. Present to users of the systems and methods of FIGS. 1-14 (i.e., computers 14, 16), subject to permissions, a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can authorize any of their respective data, e.g., all or a selected subset of data for a company or a business unit or a site or for a particular type of asset, or for a particular asset, to be viewed by selected users of the other computers 14, 16, 110 (in the '911 Application), 114 (in the '911 Application), 116 (in the '911 Application) 521, 522, 524, 526, 528 to view the selected data. For example, in exemplary embodiments, a user is permitted to authorize all or a selected subset of the users of the other computers 14, 16, 110 (in the '911 Application), 114 (in the '911 Application), 116 (in the '911 Application) 521, 522, 524, 526, 528 to view selected asset data 30, asset template data 32, personnel data 34, owner/site data 38, other template data 40, scheduling data 42, event data 44, event template data 46, notification data 48, LOTO event data 344, LOTO event template data 346, LOTO procedures data 350, and/or isolation point data 352. This data can be stored on one or more data storage devices associated with computers 14, 16, 110 (in the '911 Application), 114 (in the '911 Application), 116 (in the '911 Application) 521, 522, 524, 526, 528.

B. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can request access to all or a selected subset of data of the other users, such as all or a subset of asset data 30, asset template data 32, personnel data 34, owner/site data 38, other template data 40, scheduling data 42, event data 44, event template data 46, notification data 48, LOTO event data 344, LOTO event template data 346, LOTO procedures data 350, and/or isolation point data 352. This data can be stored on one or more data storage devices associated with computers 14, 16, 110 (in the '911 Application), 114 (in the '911 Application), 116 (in the '911 Application) 521, 522, 524, 526, 528.

C. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can purchase (or request a purchase of, subject to approval by another to whom the request is displayed on an electronic display, or request that budgeting be provided for, subject to approval by another to whom the request is displayed on an electronic display) from any of the other users or a third party an asset or supplies related to an asset, services related to an asset, other goods associated with an asset. This data can be stored on one or more data storage devices associated with computers 14, 16, 110 (in the '911 Application), 114 (in the '911 Application), 116 (in the '911 Application) 521, 522, 524, 526, 528.

D. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can access data indicating which of the users of computers 14, 16 own or lease a particular type of asset or a particular asset. This data can be stored on one or more data storage devices associated with computers 14, 16, 110 (in the '911 Application), 114 (in the '911 Application), 116 (in the '911 Application) 521, 522, 524, 526, 528.

E. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can access data indicating usage of a particular type of asset or a particular asset by the users of computers 14, 16. This data can be stored on one or more data storage devices associated with computers 14, 16, 110 (in the '911 Application), 114 (in the '911 Application), 116 (in the '911 Application) 521, 522, 524, 526, 528.

F. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can upload and optionally select desired consideration for purchase or license of event data 44, event template data 46, LOTO event data 344, LOTO event template data 346, LOTO procedures data 350, and/or isolation point data 352, such as inspection checklists for an asset or a LOTO procedure for an asset. For example, a manufacturer might upload and make available free of additional consideration (other than consideration charged by the host of the server 521) using a computer 526 event data 44, event template data 46, LOTO event data 344, LOTO event template data 346, LOTO procedures data 350, and/or isolation point data 352, such as inspection checklists for a machine made by the manufacturer or a LOTO procedure for a machine made by the manufacturer. As another example, a third party provider might upload and make available for selected monetary consideration (other than consideration charged by the host of the server 521) using a computer 522 or a computer 524 event data 44, event template data 46, LOTO event data 344, LOTO event template data 346, LOTO procedures data 350, and/or isolation point data 352, such as inspection checklists for various assets or a LOTO procedure for various assets. This data can be stored on one or more data storage devices associated with computers 14, 16, 110 (in the '911 Application), 114 (in the '911 Application), 116 (in the '911 Application) 521, 522, 524, 526, 528.

G. Present to permitted users of computers 14, 16 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users of computers 14, 16 can enter rating data (e.g., one to nn "stars") about assets and feedback (e.g., freely typed text and/or selected feedback from pre-determined feedback options) about assets. This data can be stored on one or more data storage devices associated with computers 14, 16, 110 (in the '911 Application), 114 (in the '911 Application), 116 (in the '911 Application) 521, 522, 524, 526, 528.

H. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can view ratings data about assets and/or feedback about assets. This data can be stored on one or more data storage devices associated with computers 14, 16, 110 (in the '911 Application), 114 (in the '911 Application), 116 (in the '911 Application) 521, 522, 524, 526, 528.

I. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can recommend to any of the other users or a third party an asset or supplies related to an asset, services related to an asset, other goods associated with an asset. This data can be stored on one or more data storage devices associated with computers 14, 16, 110 (in the '911 Application), 114 (in the '911 Application), 116 (in the '911 Application) 521, 522, 524, 526, 528.

J. Present to permitted users of computers 14, 16 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users of computers 14, 16 can enter rating data and/or feedback data about event data 44, event template data 46, notification data 48, LOTO event data 344, LOTO event template data 346, LOTO procedures data 350, and/or isolation point data 352, such as rating data and/or feedback data about an inspection checklist or a LOTO procedure. This data can be stored on one or more data storage devices associated with computers 14, 16, 110 (in the '911 Application), 114 (in the '911 Application), 116 (in the '911 Application) 521, 522, 524, 526, 528.

K. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can view ratings data and/or feedback about event data 44, event template data 46, notification data 48, LOTO event data 344, LOTO event template data 346, LOTO procedures data 350, and/or isolation point data 352, such as rating data and/or feedback data about an inspection checklist or a LOTO procedure. This data can be stored on one or more data storage devices associated with computers 14, 16, 110 (in the '911 Application), 114 (in the '911 Application), 116 (in the '911 Application) 521, 522, 524, 526, 528.

L. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can recommend to any of the other users or a third party particular event data 44, event template data 46, notification data 48, LOTO event data 344, LOTO event template data 346, LOTO procedures data 350, and/or isolation point data 352, such as recommending to others an inspection checklist or a LOTO procedure. This data can be stored on one or more data storage devices associated with computers 14, 16, 110 (in the '911 Application), 114 (in the '911 Application), 116 (in the '911 Application) 521, 522, 524, 526, 528.

M. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can purchase subscriptions for or otherwise subscribe to receive for event data 44, event template data 46, notification data 48, LOTO event data 344, LOTO event template data 346, LOTO procedures data 350, and/or isolation point data 352, such as recommending to others an inspection checklist or a LOTO procedure. This data can be stored on one or more data storage devices associated with computers 14, 16, 110 (in the '911 Application), 114 (in the '911 Application), 116 (in the '911 Application) 521, 522, 524, 526, 528.

N. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can generate a listing for a kit of items used in a particular procedure, e.g., a kit of LOTO locks, devices, tags, and other items associated with a particular LOTO procedure. For example, in exemplary embodiments, any of the various processors can have logic to analyze event data, such as a LOTO procedures data 350 and isolation points data 352 for a particular LOTO procedure and generate a list of items needed to perform the LOTO procedure. Additionally, in exemplary embodiments, any of the various processors can have logic to identify and present to a user on an electronic display which items of a listing for a kit of items used in a particular procedure are currently available (e.g., in stock) and which are unavailable (out of stock). Additionally, in exemplary embodiments, any of the various processors can have logic to identify which items of a listing for a kit of items used in a particular procedure are currently available (e.g., in stock) and which are unavailable (out of stock). In exemplary embodiments, logic can be provided to present a software user input, e.g., one or more pull-down menus or drop-down menus or one or more icons, with which a user can order (e.g., with a single click) the items in a listing for a kit of items used in a particular procedure or a subset thereof, e.g., ordering (e.g., with a single click) only unavailable items in the listing. This data can be stored on one or more data storage devices associated with computers 14, 16, 110 (in the '911 Application), 114 (in the '911 Application), 116 (in the '911 Application) 521, 522, 524, 526, 528.

O. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can upload data to offer for sale or purchase training services for an asset, training data for an asset for display on an electronic display, or training publications for an asset. This data can be stored on one or more data storage devices associated with computers 14, 16, 110 (in the '911 Application), 114 (in the '911 Application), 116 (in the '911 Application) 521, 522, 524, 526, 528.

P. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can upload training data for users associated with an asset and track training of users associated with an asset. This data can be stored on one or more data storage devices associated with computers 14, 16, 110 (in the '911 Application), 114 (in the '911 Application), 116 (in the '911 Application) 521, 522, 524, 526, 528.

Q. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can request the system to generate and display on an electronic display (and optionally save and/or transmit to selected others electronically) analytics calculated from any of the data herein, e.g., asset data 30, personnel data 34, event data 44, notification data 48, LOTO event data 344, LOTO procedures data 350, and/or isolation point data 352 (for the user's own company and/or for that data at other companies). Exemplary analytics include: aggregate product usage characteristics (e.g., failure statistics or defect statistics for a selected asset or selected assets, rankings of best performing products for a selected asset type) and safety compliance metrics (by industry, by position, by worker, by trainer), safety compliance comparisons (by industry, by position, by worker, by trainer), safety compliance scorecards (by industry, by position, by worker, by trainer), predictions of next failure for each asset (e.g., based on time (time, mileage, hours of operation, or some combination) since a prior failure and mean time (time, mileage, hours of operation, or some combination) between failure for that asset or the same asset at selected locations or the same asset throughout the system), and predictions of next safety event timing for each asset (e.g., based on time (time, mileage, hours of operation, or some combination) since a prior safety event and mean time (time, mileage, hours of operation, or some combination) between safety events for that asset or the same asset at selected locations or the same asset throughout the system), etc. In exemplary embodiments, logic continuously calculates predictions of next failure for each asset and predictions of next safety event timing for each asset and sends notifications to subscribers (e.g., maintenance personnel or safety personnel) using notification logic 50 if the predicted time is within a selected window, e.g., a selected number of months or weeks or days. In exemplary embodiments, preventative maintenance logic automatically schedules maintenance events based on usage data for an asset, mileage data for an asset, hours in use data for an asset, predictions of next failure for each asset, and/or predictions of next safety event for each asset. Such preventative maintenance logic can automatically adjust a maintenance schedule for an asset based on predictions of next failure for each asset, and/or predictions of next safety event for each asset. Such preventative maintenance logic can combine more frequent maintenance events into annual or other less frequent events. This data can be stored on one or more data storage devices associated with computers 14, 16, 110 (in the '911 Application), 114 (in the '911 Application), 116 (in the '911 Application) 521, 522, 524, 526, 528.

R. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can automatically generate LOTO signs and other documents when a LOTO procedure is approved. In exemplary embodiments, processors have logic that automatically electronically sends an order to a site (or sends a request for quotation to a plurality of sites) to have corresponding LOTO signs printed in response to a LOTO procedure being approved, as indicated by LOTO procedures data 350 and/or isolation points data 352. In exemplary embodiments, this logic is tied to internal or 3rd party purchasing software to handle the transaction after a sign order is placed or to accept bids to fulfill the sign order, accept one of the bids, process the order, and handle purchasing after an RFQ is issued. In exemplary embodiments, this logic is tied to internal or 3rd party commercial printing software for printing and interfaces with one or more payment services to exchange money between the parties to the contract to purchase the signs. This data can be stored on one or more data storage devices associated with computers 14, 16, 110 (in the '911 Application), 114 (in the '911 Application), 116 (in the '911 Application) 521, 522, 524, 526, 528.

S. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can request the system to identify, access, and combine for transmittal VPP data to submit to OSHA for prequalification. Subject to user permissions, at a user's request (e.g., by activating an icon or a menu entry), such VPP data can be collected from any of the data herein, e.g., asset data 30, personnel data 34, event data 44, notification data 48, LOTO event data 344, LOTO procedures data 350, and/or isolation point data 352 (for the user's own company). In exemplary embodiments, there is logic to collect pertinent data, combine the collected data, and transmit the collected data (e.g., to VPPPA or VPPPC) to meet VPP requirements. In the alternative, this logic can be configured to automatically collect and transmit VPP data from time to time, e.g., every one (1) day (or a selected number of days). This data can also be stored on one or more data storage devices associated with computers 14, 16, 110 (in the '911 Application), 114 (in the '911 Application), 116 (in the '911 Application) 521, 522, 524, 526, 528.

T. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can request to access and view VPP data submitted by others, e.g., VPP data submitted via the computers 14, 16, 110 (in the '911 Application), 114 (in the '911 Application), 116 (in the '911 Application) 521, 522, 524, 526, 528. In exemplary embodiments, logic accepts monetary consideration from the requester and transmits the requested VPP data. This data can be stored on one or more data storage devices associated with computers 14, 16, 110 (in the '911 Application), 114 (in the '911 Application), 116 (in the '911 Application) 521, 522, 524, 526, 528.

U. Present to permitted users of computers 14, 16, 110 (in the '911 Application), 114 (in the '911 Application), 116 (in the '911 Application) 521, 522, 524, 526, 528 a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which permitted users can identify an asset (e.g., by scanning the asset) and request information about the assert or that type of asset from others, e.g., instantly obtain all prior released safety and other pertinent information about the asset from users, the manufacturer, and others and/or subscribe to future safety information about the asset from users, the manufacturer, and others. The data can include aggregate end user data on compliance status being for sale or subscription to multiple service providers and for use by end user organizations. In exemplary embodiments, logic accepts monetary consideration from the requester and immediately or periodically transmits the requested information to the subscriber. This data can be stored on one or more data storage devices associated with computers 14, 16, 110 (in the '911 Application), 114 (in the '911 Application), 116 (in the '911 Application) 521, 522, 524, 526, 528.

Additionally, all of the above data can be temporarily queued to local memory of any of the computers and later transferred to and saved on data storage devices on any of computers 14, 16, 110 (in the '911 Application), 114 (in the '911 Application), 116 (in the '911 Application) 521, 522, 524, 526, 528, e.g., using remote data logic 54, 54' and/or offline device logic 56, 56'.

As mentioned herein, logic of the various computers herein can interface with internal and 3rd party work flow software by sending notifications thereto using notification logic 50. In exemplary embodiments, the various computers 14, 16, 110 (in the '911 Application), 114 (in the '911 Application), 116 (in the '911 Application) 521, 522, 524, 526, 528 (with or without the systems and methods discussed in connection with any one or more of FIG. 9, FIG. 10, FIG. 11, FIG. 12, FIG. 13, FIG. 14, and/or FIG. 15) have logic stored in one or more data storage devices to cause their respective processor(s) to accept worker availability data received from internal and/or 3rd party workflow software. In exemplary embodiments, the computers 14, 16, 110 (in the '911 Application), 114 (in the '911 Application), 116 (in the '911 Application) 521, 522, 524, 526, 528 (with or without the systems and methods discussed in connection with any one or more of FIG. 9, FIG. 10, FIG. 11, FIG. 12, FIG. 13, FIG. 14, and/or FIG. 15) have logic stored in one or more data storage devices to cause their respective processor(s) to present to a user a software user input, e.g., one or more pull-down menus or drop-down menus, one or more icons or hyperlinks, and/or one or more freeform text fields into which text can be freely typed with a computer keyboard, to permit a user to perform any one or more of the following, and have logic to perform any one or more of the following:

A. In exemplary embodiments a user requests data about the availability of a particular worker; logic accepts the request, parses the request, queries the internal workflow software or 3rd party workflow software, receives availability data, and displays the availability data on an electronic display for planning purposes.

B. In exemplary embodiments a worker requests a path to take to find a specific location, e.g., an asset or an isolation point of a LOTO procedure; logic accepts the request, parses the request, determines the current location of the worker (e.g., using WiFi signals, GPS signals, or other wireless signals), determines the coordinates of the desired location (e.g., from asset data 30, map data, or other data), determines a route for the worker (e.g., using map data), and presents the route to the worker via an electronic display on the worker's computer, e.g., a map or a series of textual directions. In the alternative, in exemplary embodiments, logic presents the worker with an augmented reality electronic display in which the worker holds up a handheld computer (e.g., a smart-phone or a pad computer) with a camera on the opposite side and, while the handheld computer displays the view in front of the worker, logic overlays onto the display visual information directing the worker toward the location, e.g., overlaying an arrow on the floor directing the worker to walk straight, turn left, turn right, or turn around or overlaying the LOTO symbol for an isolation point (e.g., E-1 or W-2) on top of the actual isolation point location on the display.

C. In exemplary embodiments a worker requests a path to take to work on a plurality of locations, e.g., an series of asset or a series of isolation points of a LOTO procedure; logic accepts the request, parses the request, determines the current location of the worker (e.g., using WiFi signals, GPS signals, or other wireless signals), determines the coordinates of the desired locations (e.g., from asset data 30, map data, or other data), determines a route for the worker (e.g., using map data) that takes the worker from point to point using the shortest distance (taking into consideration that some locations must be visited before others), and presents the route to the worker via an electronic display on the worker's computer, e.g., a map or a series of textual directions, showing the directions location by location or in a summary of routes for all or a subset of locations.

D. In exemplary embodiments a worker activates location-based notifications; logic accepts the request, parses the request, periodically determines the current location of the worker (e.g., using WiFi signals, GPS signals, or other wireless signals), periodically compares the present location of the worker to the locations of numerous scheduled events in the area of the worker that the worker is permitted to perform, if there is a scheduled event and directly notifies the worker using notification logic 50 that the worker is very near a scheduled event the worker can perform and, optionally, automatically assigns the worker to that scheduled event. In exemplary embodiments, the workers computer can indicate to the worker the distance to the scheduled event location, e.g., by displaying a route on an electronic display or by providing an audible signal, e.g., a series of beeps that get more and more frequent as the worker gets closer to the location of the scheduled event.

E. In exemplary embodiments logic prevents a user from re-scanning a LOTO lock used in a LOTO procedure. Instead, the logic either does nothing or sends a notification to subscribers of such improper events using notification logic 50.

F. In exemplary embodiments logic correlates LOTO locks, LOTO procedures, LOTO lockout devices, and LOTO tags, and prevents a user from re-using (e.g., re-scanning) ay of these for a different LOTO procedure. Instead, the logic either does nothing or sends a notification to subscribers of such improper events using notification logic 50.

G. In exemplary embodiments, logic continually or periodically analyzes scheduling data for events that did not happen as scheduled and sends a corresponding notification to subscribers of such missed events using notification logic 50.

H. In exemplary embodiments, logic continually or periodically generates and displays on an electronic display (and/or presents a software user input with which a user can request the display of) selected single and aggregated metrics, e.g., lockout statuses, checkout statuses, procedure statuses, etc.

I. In exemplary embodiments, RFID padlocks, RFID lockouts, and RFID LOTO tags (e.g., those in the '911 Application and the '935 Application) are used in LOTO procedures in the systems and methods described herein. Handheld computers communicate with LOTO locks, LOTO lockouts, and LOTO location tags. Logic is provided to communicate therebetween using bump technology, NFC technology, WiFi, Bluetooth technology, optical bar code technology, and other technology, e.g., a user scans a LOTO lock to lock or unlock the lock or secure or release a secondary blocker, depending on permissions (data can restrict which locks and blockers can be opened or secured by whom, with different levels being used, such as a worker being able to open or secure one lock/blocker at a time, to a worker being able to open or secure all locks and blockers for that worker's LOTO class, to a worker being able to open or secure all locks and blockers at that location, to a worker being able to open or secure all locks and blockers in the system).

J. In exemplary embodiments, all RFID tags and other tags herein can be modified to include owner data as part of the scanned tag code. As a different owner is assigned, the owner data portion of the tag data will be changed, e.g., written to the tag. Consequently, in exemplary embodiments, logic is provided that when a tag is scanned, data relating to the owner is displayed on an electronic display, e.g., textual display of the owner's name and a digital picture of the owner.

K. In exemplary embodiments, logic is provided that generates multi-dimensional views on an electronic display and/or prints reports of asset data 30, e.g., a so-called spider web diagram, such as an n-dimensional spider web diagram with various parameters of a particular asset displayed on each dimension. For example, a user selects with a software user input a particular asset (or a pair of assets to be compared side-by-side), or all assets of the same type (or all assets of two different types to be compared side-by-side), or all assets of the same make and model (or all of two makes and models for side-by-side comparison) and, in response, logic accesses data, calculates, generates, and displays or prints the multi-dimensional views (or displays or prints them side-by side). An exemplary multi-dimensional view includes an n-dimensional spider web diagram showing any two or any three or more of the following on separate dimensions can be displayed on an electronic display and/or printed: (i) number of incidents over the asset's lifetime or over a user-selected time window, (ii) time in service, (iii) risk factor (e.g., calculated by last inspected day, next inspection day, and number of failures of similar equipment in the same timeframe), (iv) lost time (e.g., in hours or days), and (v) cost of lost time (e.g., in dollars). Such information can be helpful in making holistic asset decisions. For example, a particular piece of PPE might have a lower purchase cost, but it might have a much higher cost of lost time or a much higher number of incidents than a slightly more expensive model.

L. In exemplary embodiments, logic presents a user software input for a user to input data for reporting requirements, e.g., OSHA Form 300. A form with various software fields can be provided with which a user inputs into the system data about a work-related injury or illness that meets certain requirements, such as employee name, date of injury or illness onset, where the event occurred, description of the injury or illness, parts of body affected, and object/substance that directly injured the person or made the person ill, one or more classification codes for the injury (e.g., death, one or more days away from work, remained at work, but was transferred or restricted, and other recordable case), the number of days the worker was away from work, the number of days the worker was transferred or restricted, and type of injury or illness (e.g., injury, skin disorder, respiratory condition, poisoning, hearing loss, or other injury or illness). This data can be stored as personnel data 34. In exemplary embodiments, logic presents a user software input for a user to request that a form 300 be completed for a particular period of time. In response, the logic accesses the personnel data 34 and inserts the data into a blank Form 300, which completed form can be saved, printed, and/or transmitted.

M. In exemplary embodiments, logic is provided to generate, store, print, and transmit environmental compliance ratings and/or scores for facilities using various data in the system.

N. In exemplary embodiments, logic provides a software user input with which a user can select one or more substances and, in response, logic displays on an electronic display to the user data documents for the substance(s), e.g., an MSDS sheet for the one or more substances or other documents. Instead of directly providing the data documents for the substance(s) to the user, logic can provide a purchase interface with which a user can provide monetary consideration for the ability to down load the data documents for the substance(s) and after consideration is provided, e.g., by providing subscription information or from a credit card or a service such as PayPal, the data documents for the substance(s) are provided for display or download.

O. In exemplary embodiments, logic is provided for scanning handheld computers (e.g., RFID readers such as RFID reader 110 in the '911 Application and smart phones that are NFC-capable, Bluetooth capable, or WiFi capable, or that have a camera to scan optical bar codes and other optical tags) to collect data from an asset or otherwise relating to an asset by scanning a tag associated with the asset. Such scanned data can be automatically input and saved as asset data 30 or other data. In exemplary embodiments, the tag provides a tag value having at least one portion for identification and another portion with data for the scanned asset. For example, logic can be provided to input gas detection log data by scanning a gas detection unit tag with a scanning handheld computer. In exemplary gas detection log data embodiments, the tag provides a tag value having at least one portion for identification and another portion with gas detection log data for the scanned gas detector. This logic can be applied to virtually any asset, e.g., ropes, PPE, etc. For example, a rope tag can provides a tag value having at least one portion for identification and another portion with data for test status of the rope, e.g., the date the rope was last pull-tested. As assets are used, a user can scan the assets to ensure they have data indicating a recent enough test.

P. In exemplary embodiments, logic is provided to access data for a plurality of companies, calculate for the plurality of companies a safety record value, a regulatory compliance value, and an incident rate and provide a ranking of the companies based on a weighted sum of at least those calculated values.

Q. In exemplary embodiments, one type of event is an inspection for compliance with various commercial standards, e.g., those promulgated by the International Organization for Standardization, e.g., ISO 9000, ISO 9001, ISO 9002, and all of the various logic and data herein relating to asset inspection events also apply to inspection events for compliance with various commercial standards. In other exemplary embodiments, one type of event is a health inspection of a restaurant for compliance with various local, state, and federal health laws, and all of the various logic and data herein relating to asset inspection events also apply to restaurant health inspection events. In other exemplary embodiments, one type of event is a health inspection of a food provider for compliance with various local, state, and federal health laws, and all of the various logic and data herein relating to asset inspection events also apply to food provider health inspection events. In other exemplary embodiments, one type of event is any other health inspection for compliance with various local, state, and federal health laws, and all of the various logic and data herein relating to asset inspection events also apply to other health inspection events.

R. In exemplary embodiments, logic is provided to facilitate product recall tracking, food recall tracking, and drug recall tracking. Logic receives scan data from scanning handheld computers about various products or food or drugs and accesses data indicating if the product, food, or drug has any active recalls or notifications, which are displayed to the user or another on an electronic display, along with a degree of concern for the product, food, or drug (based, e.g., on the number of incidents or if testing results suggest action or reporting). In exemplary embodiments, logic automatically generates corrective actions, e.g., sends notifications to subscribers using notification logic 50 relating to, and/or taking other action with respect to, replacing the asset with a substitute, based on received recall information.

S. In exemplary embodiments, logic is provided that generates personnel data 34 based on scans of worker badges, e.g., for all workers scanned or all un-scanned workers who would have been expected to be there. For example, all workers' badges can be scanned as they enter a building, work area, mine, secure area, meeting (e.g., a required safety meeting or a training class), etc. which data can be saved as personnel data 34. As another example, all workers' badges can be scanned as they leave a building, work area, mine, secure area, meeting (e.g., a required safety meeting or a training class), etc. which data can be saved as personnel data 34. This data can be used as-is (e.g., for attendance purposes) and can also be used in conjunction with other data. For example, at a fire drill meeting location outside an evacuated building, all worker's badges can be scanned and those workers who scanned in but who failed to be scanned at the fire drill meeting point can be reported via notification logic 50 to subscribers that certain individuals missed a fire drill. In exemplary embodiments, logic can process data, e.g., personnel data, and automatically sign up a worker for corresponding training, e.g., flag a worker in personnel data 34 that the worker needs corresponding training. For example, logic can automatically sign up for fire drill training any workers who scanned in but who failed to be scanned at the fire drill meeting point. As another example, logic can continually or periodically check to see if a worker has met or exceeded a threshold number of incidents with a single asset or a single type of asset and, if so, the logic can automatically sign up the worker for corresponding training for that asset, e.g., flag a worker in personnel data 34 that the worker needs corresponding training for that asset, and generate and transmit notifications to subscribers with notification logic 50.

T. In exemplary embodiments, logic permits a which a user to identify (e.g., change) the current location of an asset. In exemplary embodiments a worker scans an asset with a scanning handheld computer or otherwise identifies an asset via a handheld computer and uses a software user input, e.g., an icon, to indicate that the current location of the computer is to be saved as the location of the asset in asset data 30. In response, the logic accepts the request, parses the request, determines the current location of the worker (e.g., using WiFi signals, GPS signals, or other wireless signals), and saves that location in asset data 30 as the location of the scanned or identified asset.

U. In exemplary embodiments, logic permits a user to accept or otherwise acknowledge workplace rules and regulations. In exemplary embodiments a worker logs in and is presented on a computer display the workplace rule or regulation and is presented with one or more software user inputs, e.g., an icon to accept or acknowledge the rule or regulation and an icon to refuse to accept or acknowledge the rule or regulation. In response, the logic accepts the input that data as personnel data 34.

V. In exemplary embodiments, logic integrates security logic 36 for user logins with directory services data and provides users with single sign-on (SSO) functionality, i.e., the user logs in once and gains access to all systems or a plurality of systems without being prompted to log in again at each of the other systems. The login status of users is tracked as personnel data 34 and security logic 36 permits access to other systems without requiring separate logins.

W. In exemplary embodiments, logic accepts user input regarding and saves as personnel data 34 the size of each fitted asset that best fits the worker and other sizes of fitted assets that the worker is permitted to use. For example, a user might fit one safety harness best, but might also be permitted to use one size larger if it can be tightened to fit if the best size is unavailable. This data can be displayed in response to scanning a user tag and/or scanning the tag of an asset. In exemplary embodiments, a software user input activates logic expecting the scan of a user and a scan of an asset and the logic accesses personnel data 34 and displays on an electronic display whether the scanned user is permitted to use the scanned asset.

X. In exemplary embodiments, logic provides a software user input with which a user can select one or more rules or regulations and, in response, logic displays on an electronic display to the user data documents pertaining to the rules or regulations, e.g., the text of the rules and regulations. Instead of directly providing the data documents(s) to the user, logic can provide a purchase interface with which a user can provide monetary consideration for the ability to down load the data documents and after consideration is provided, e.g., by providing subscription information or from a credit card or a service such as PayPal, the data documents are provided for display or download.

Y. In exemplary embodiments, logic provides a software user input with which a user can enter into the system quality assurance/quality control data (e.g., data from samples taken at the start of a shift, periodically throughout a shift, and/or at the end of a shift) and, in response, logic saves the data as asset data 30, analyzes the data and, if appropriate (e.g., any of the values are above or below or at applicable thresholds), suggests that an adjustment to one or more assets be made (e.g., adjusting a manufacturing machine). If a user accepts the proposed adjustment with a software user input, e.g., by actuating an icon, the system can automatically and without user intervention initiate a LOTO procedure for the affected asset(s), including generating scheduling data for the event using scheduling logic and notifying affected persons using notification logic 50. Such data can be offered for sale or subscription using the exemplary marketplace of FIG. 15 and the various logic modules described in connection with FIG. 15. Such data can be made available to the marketplace anonymously and/or with attribution, for a single location or multiple locations, and/or for single events or within a time window.

Z. In exemplary embodiments, logic permits users to track assets at a facility along with calibration history, inspections, and results. Exemplary assets include scales, calipers, flow meters, torque wrenches, micrometers, gas detectors, laboratory machines, etc. In exemplary embodiments, a tag is added to each asset having calibration data or other test data and logic receives a scan of an asset from a user, identifies the asset based on the scan using asset data 30, accesses the requested calibration data or test data from asset data 30, and transmits the calibration data or test data to the computer used to scan the asset, where logic displays the calibration data or test data on an electronic display. In exemplary embodiments, a software user input is provided with which a user can input to the system additional calibration data or test data, e.g., an icon is provided to indicate that additional calibration data or test data is being input for the scanned or selected asset and a freeform text field into which the user types the calibration data or test data, which data is saved as additional asset data 30.

AA. In exemplary embodiments, logic manages worker training based on LOTO class and determines who has access to which classes, determines whether a worker has proper training to perform a task, inspection, or procedure (e.g., an assigned task, inspection, or procedure), determines whether a worker has had proper human resources training, offers training modules for sale or subscription using the exemplary marketplace of FIG. 15 and the various logic modules described in connection with FIG. 15, determines a rating for trainers based on the number of reported injuries and/or other safety incidents for trainees of that trainer, and/or presents a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which administrative personnel or other users can display on an electronic display all needed training and/or all accomplished training, and/or assign training to users.

AB. In exemplary embodiments, logic is provided to present a visual indication on a physical badge or electronic display of a badge representation to indicate that a user is authorized to perform a task, event, or procedure, e.g., overlaying a list of LOTO prefixes in the corresponding LOTO colors indicating that the user is authorized to isolate isolation points of that LOTO class.

AC. In exemplary embodiments, logic is provided to permit subscribers in the context of the exemplary marketplace of FIG. 15 and the various logic modules described in connection with FIG. 15, to view training modules free of additional consideration.

AD. In exemplary embodiments, gamification logic is provided to reward users for reporting incidents and/or performing tasks without injury and/or attending safety training classes, e.g., for each such event, entered into the system using a software user input, the user receives one or more points, which are all selectively displayed by the system on an electronic display. In exemplary embodiments, a software user input is presented with which a user can redeem collected points for monetary compensation, for prizes, e.g., goods or services (in which case the system can communicate or integrate with a 3rd party company for delivery of the redeemed goods or services). In exemplary embodiments, manufactures using the exemplary marketplace of FIG. 15 and the various logic modules described in connection with FIG. 15, can redeem points earned from inspections and safety tasks for products, marketplace credits, etc.

Any or all of the above data and logic can be stored on one or more data storage devices associated with computers 14, 16, 110 (in the '911 Application), 114 (in the '911 Application), 116 (in the '911 Application) 521, 522, 524, 526, 528. Additionally, all of the above data can be temporarily queued to local memory of any of the computers and later transferred to and saved on data storage devices on any of computers 14, 16, 110 (in the '911 Application), 114 (in the '911 Application), 116 (in the '911 Application) 521, 522, 524, 526, 528, e.g., using remote data logic 54, 54' and/or offline device logic 56, 56'.

Additionally, in exemplary embodiments, articles of personal protection equipment are provided with tags having a UHF transmitter for transmitting tag data, e.g., identification data, calibration data, test data, etc. Also, all of the tags mentioned herein and in the '911 Application can optionally have a UHF transmitter for transmitting tag data, e.g., identification data, calibration data, test data, etc.

In addition, in exemplary embodiments, all of the tags mentioned herein and in the '911 Application can optionally have a universally unique identifier (UUID) stored in a data storage device therein for transmission of identification data during scanning (either alone or with calibration data, test data, etc.). Also, all of the tags mentioned herein and in the '911 Application can optionally have a receiver in communication with a writeable memory to permit tag data, e.g., identification data, calibration data, test data, etc. to be written to the tag memory in the field, which tag data can be read during subsequent scans of the tag.

In exemplary embodiments, various logic is provided to provide to the system evidence of proximity of a scanner to a scanned tag, e.g., any one or more of the following:

A. In exemplary embodiments, logic is provided in the system memory and in the tag to increment or decrement or otherwise change at least a portion of data read from a tag. For example, when a user scans a tag, a portion of the tag data and a corresponding data entry in the system change in a predictable fashion. Thus, a user must actually scan a tag as part of the procedure or the tag will be unsynchronized with the system, which un-synchronization can generate notifications to subscribers of such un-synchronizations using notification logic 50.

B. In exemplary embodiments, logic is provided to force the data scanned from a tag into data fields on all user interfaces displaying scan data, i.e., making the data from a scan un-editable by any users. In such embodiments, asset data 30 for an asset can only be accessed for an asset, and procedures can only be performed on an asset, that has been properly scanned using a scanner in communication with the system or using remote device logic 54, 54' and/or offline device logic 56, 56'.

C. In exemplary embodiments, logic is provided to take and upload to the system a new photograph of the location of a procedure (or of a sticker at the location, e.g., a LOTO sticker) with a timestamp, e.g., taking and uploading the photo with the device being used to perform the procedure.

D. In exemplary embodiments, logic is provided for a device to write data to a tag as part of a tag scan in connection with an event such as an inspection or a LOTO procedure. The data written to the tag can include data with a data and time of the scan and the identity of the user logged into the machine being used to scan the tag, and/or other personnel data 34 for that user and/or other event data 44 for the corresponding event.

E. In exemplary embodiments, logic is provided to accept data scanned by a user from a separate location tag at a location to indicate proximity to that location (e.g., a separate tag on a machine or on a portion of another asset), which can be near an asset affected by an event. The location of such location tags can be changed randomly or unpredictably to require both a scan of the asset affected by the event and a scan of the location tag.

F. In exemplary embodiments, logic is provided to require a user to scan an optical tag, e.g., a 2D barcode indicating a particular location related to an event, before the user is permitted to scan an active tag associated with the event.

G. In exemplary embodiments, logic is provided to require a user to meet an authentication condition before the user is permitted to scan a tag associated with an event.

H. In exemplary embodiments, logic is provided to require two people working together to scan a tag associated with an event before the system will acknowledge the scan for purposes of fulfilling the event.

I. In exemplary embodiments, logic is provided to require a scan of a tag to start an event and/or start a step of an event and/or continue with an event and/or continue with a step of an event (such as a scan of an RFID tag, a scan of a barcode, a scan of an NFC tag, or taking a photograph), but no data from the scan is recorded to any of the data storage devices. The logic starts or continues the event, but no data used as a condition to starting or continuing is saved.

J. In exemplary embodiments, logic is provided to permit a user to set a time minimum or a duration of time during which activity for an event must occur for the activities to considered to be valid. If activities for an event fall outside the minimum time or the time window (e.g., activities happen too fast), notifications can be sent to subscribers of such conditions using notification logic 50.

K. In exemplary embodiments, logic is provided to allow data scanned from a tag to be edited in data fields on all user interfaces displaying scan data; however, authorization is needed to override scanned tag data. For example, if approval to edit scan data is needed, logic in the computer can accept the approval to finalize the scan of that tag. In exemplary embodiments, if approval is needed to edit tag data, the computer presents a software user input, e.g., locations for a foreman or other supervisor to type in a username and password to indicate approval. Additionally, if approval is needed, in exemplary embodiments, the system notifies approval personnel using any of the various notification systems and methods discussed above in connection with the notification logic 50 using any one or more direct or indirect notifications to subscribers discussed above, e.g., a text or an e-mail and/or notification via internal or 3rd party workflow software.

L. In exemplary embodiments, events and procedures include inspections of vehicles (e.g., automobile, light duty truck, medium duty truck, heavy duty truck, school bus, commercial bus, etc.), and one or more of the various event logic and data herein relating to inspections, and one or more of the various systems and methods herein relating to inspections and other procedures (e.g., examples A-K, immediately above), can be used with respect to inspection of vehicles. For example, in exemplary embodiments, logic is provided to facilitate vehicle inspections using stored inspection checklists, including requiring an inspector to scan a tag at one or more locations as evidence that the inspector was close enough to one or more portions of the vehicle to inspect those one or more portions of the vehicle.

Any or all of the above data and logic can be stored on one or more data storage devices associated with computers 14, 16, 110 (in the '911 Application), 114 (in the '911 Application), 116 (in the '911 Application) 521, 522, 524, 526, 528. Additionally, all of the above data can be temporarily queued to local memory of any of the computers and later transferred to and saved on data storage devices on any of computers 14, 16, 110 (in the '911 Application), 114 (in the '911 Application), 116 (in the '911 Application) 521, 522, 524, 526, 528, e.g., using remote data logic 54, 54' and/or offline device logic 56, 56'.

Figure 16:
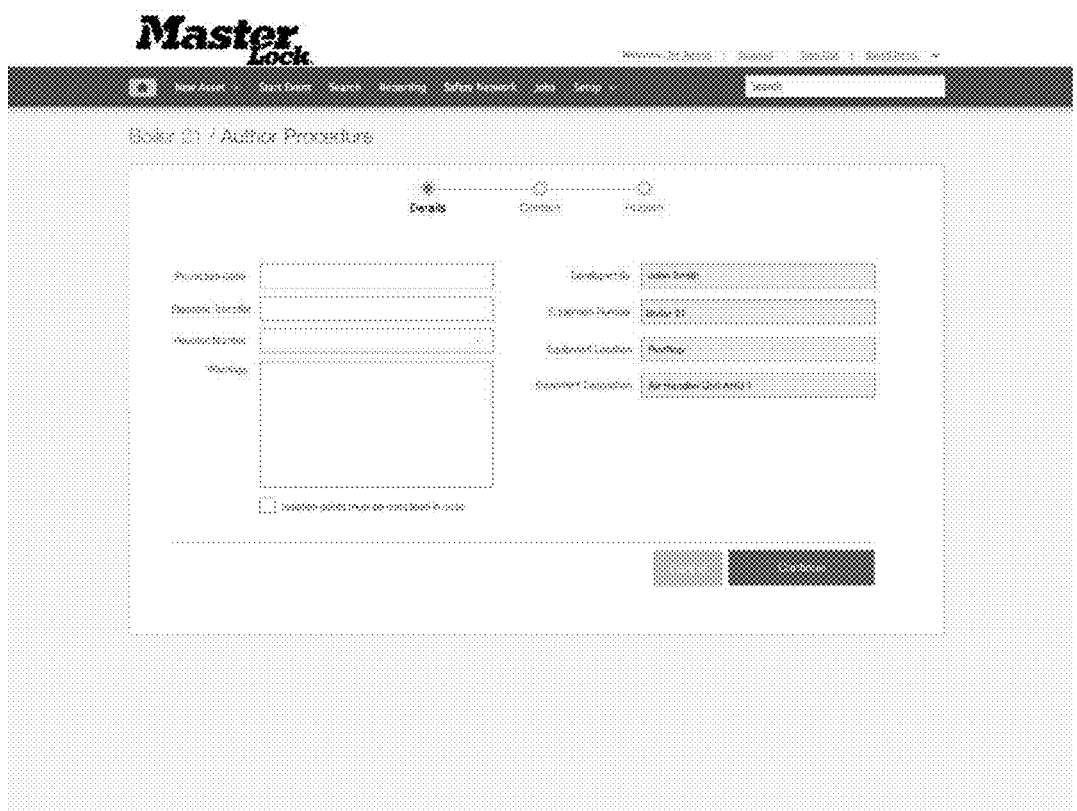
FIGS. 16-25 are screenshots of an exemplary user interface for creating and saving a LOTO procedure.

Referring again to the drawings, FIGS. 16-25 are screenshots or screenshots of an exemplary user interface for creating and saving a LOTO procedure. FIG. 16 is an exemplary screenshot starting the process of creating a LOTO procedure. To get to this screen, a user has identified an asset, e.g., using search logic 58, and has activated a software user input, e.g., an icon or an active hyperlink. In response logic displays the exemplary screen of FIG. 16. In this example, logic provides several of the fields as freeform text fields. In this example, logic forces data on the right side into the fields on the right from asset data 30 for the selected asset and personnel data for the user logged into the computer being used. In this example, logic embeds the Electronic Identifier into the printed sheet (e.g., a 2D barcode) to permit a user to scan the procedure sheet to start the LOTO procedure. In this example, logic auto-generates data in the Revision Number field, which can be overridden by a user by typing other data in the data field. The user activates the Continue icon to save this data and move to the next screen.

Figure 17:
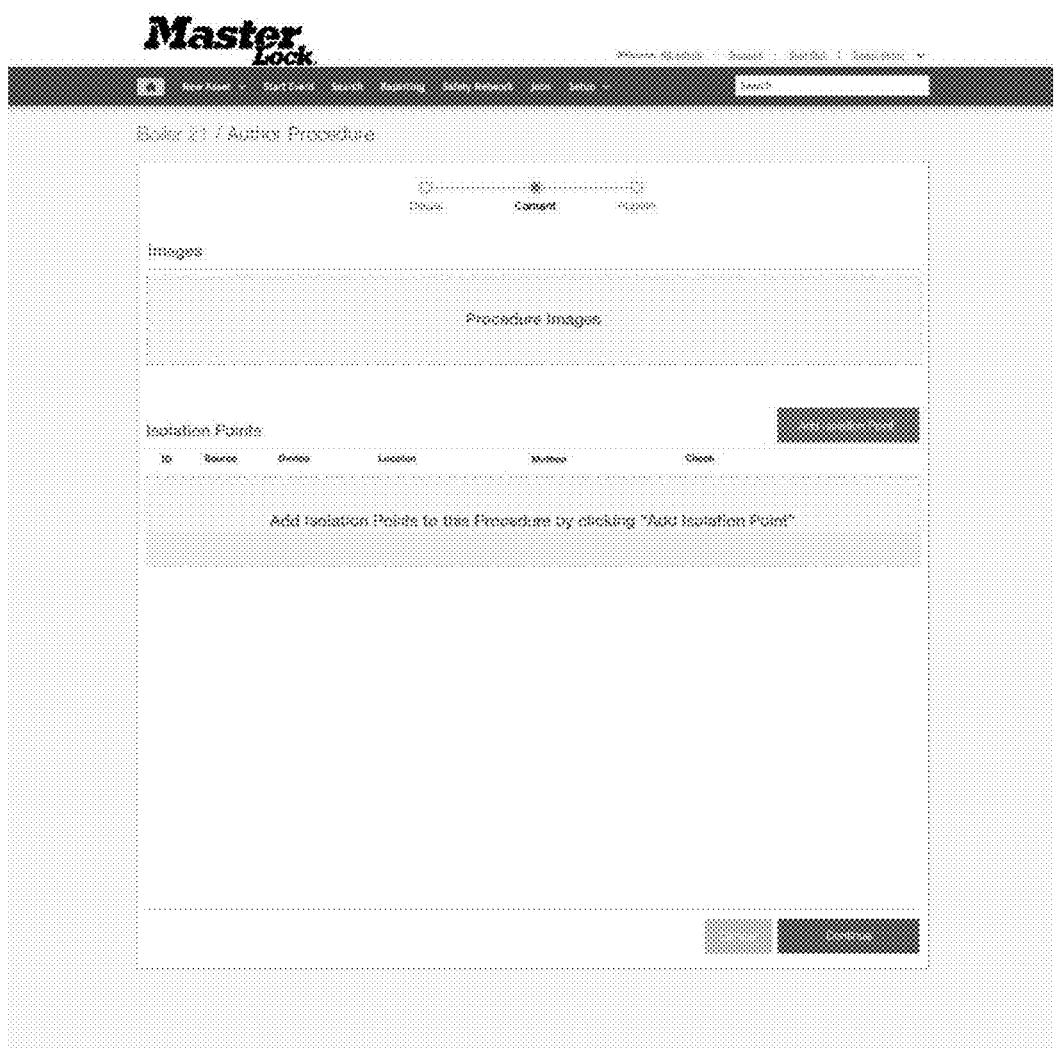
Figure 18:
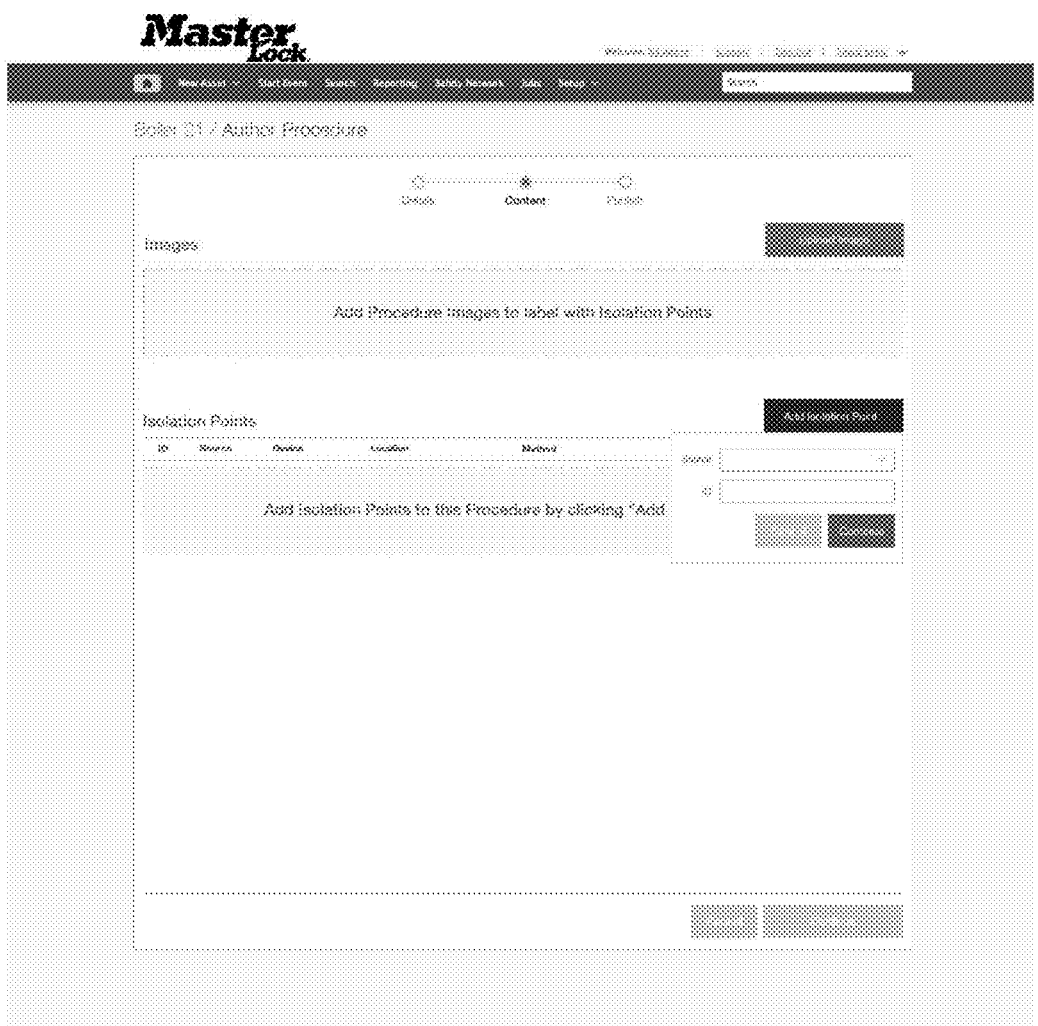

FIG. 17 is an exemplary screenshot continuing the process of creating a LOTO procedure. In this example, logic provides an Add Isolation Point icon and a Continue icon for the user. In this display, logic displays all images uploaded for the LOTO procedure under "Procedure Images" and will display under Isolation Points all isolation points created in the same format as the procedure sheet if printed. The user activating the Add Isolation Point causes logic to display a screen with which the user can select an Energy Source screen and a energy source ID for the isolation point, as exemplified by FIG. 18. In this example of FIG. 18, the user uses a pull-down menu to select from a pre-determined list of energy sources, e.g., electrical, water, etc. In this example, logic auto-generates the ID based off of the last ID of that energy source for this procedure so they start at 1 for each energy source and are numbered sequentially. For example, in response to a user selecting Water the first time, logic would generate ID W-1, and in response to a user selecting Water the first time, logic would generate ID W-2, etc. The Sources are stored in the database with the Name, ID (W, E, etc.), and all colors associated with the LOTO tag. The user activates the Continue icon to save this data and move to the next screen, exemplified by FIG. 19.

Figure 19:
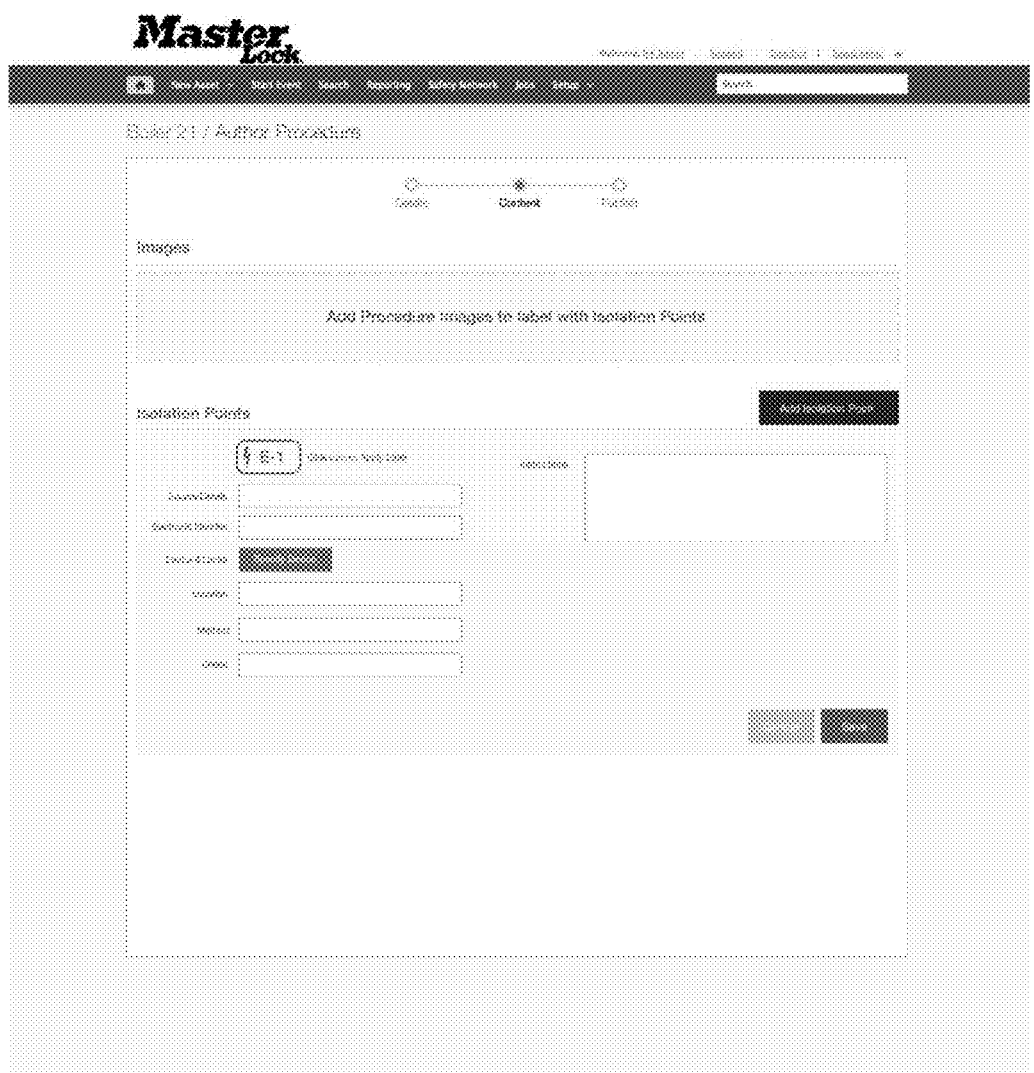
Figure 20:

FIG. 19 is an exemplary screenshot continuing the process of creating an isolation point. In this example, logic provides a plurality of freeform text fields and a pull down menu with which a user can select LOTO lockout devices and LOTO locks for the isolation point. In this example, logic displays on the screen a preview of the isolation point icon based on the selected Source and ID. In this example, logic responds to the user clicking on the isolation point icon by presenting a display with which the user can take, upload, and/or annotate an image for this isolation point (FIG. 20). In this example, logic permits the user to enter an Electronic Identifier for this isolation point, allowing the isolation point to be scanned to start the process of isolating that isolation point. In this example, logic for the Device and Locks user software input permits a user to either free-form enter a device and lock or select from inventory the specific device and locks need for the isolation point. The user activates the Save icon to save this data and move to the next screen.

FIG. 20 is an exemplary screenshot continuing the process of creating an isolation point, e.g., by providing an image annotation tool. In this example, logic displays the screen of FIG. 20 in response to a user activating isolation point icon. In this example, logic permits a user to select from an existing image or upload a new image for the isolation point. In this example, logic permits a user to simply click on a location in the image and logic embeds the appropriate isolation point icon into the data file for the image. The user activates the Save icon to save this data and move to the next screen.

Figure 21:
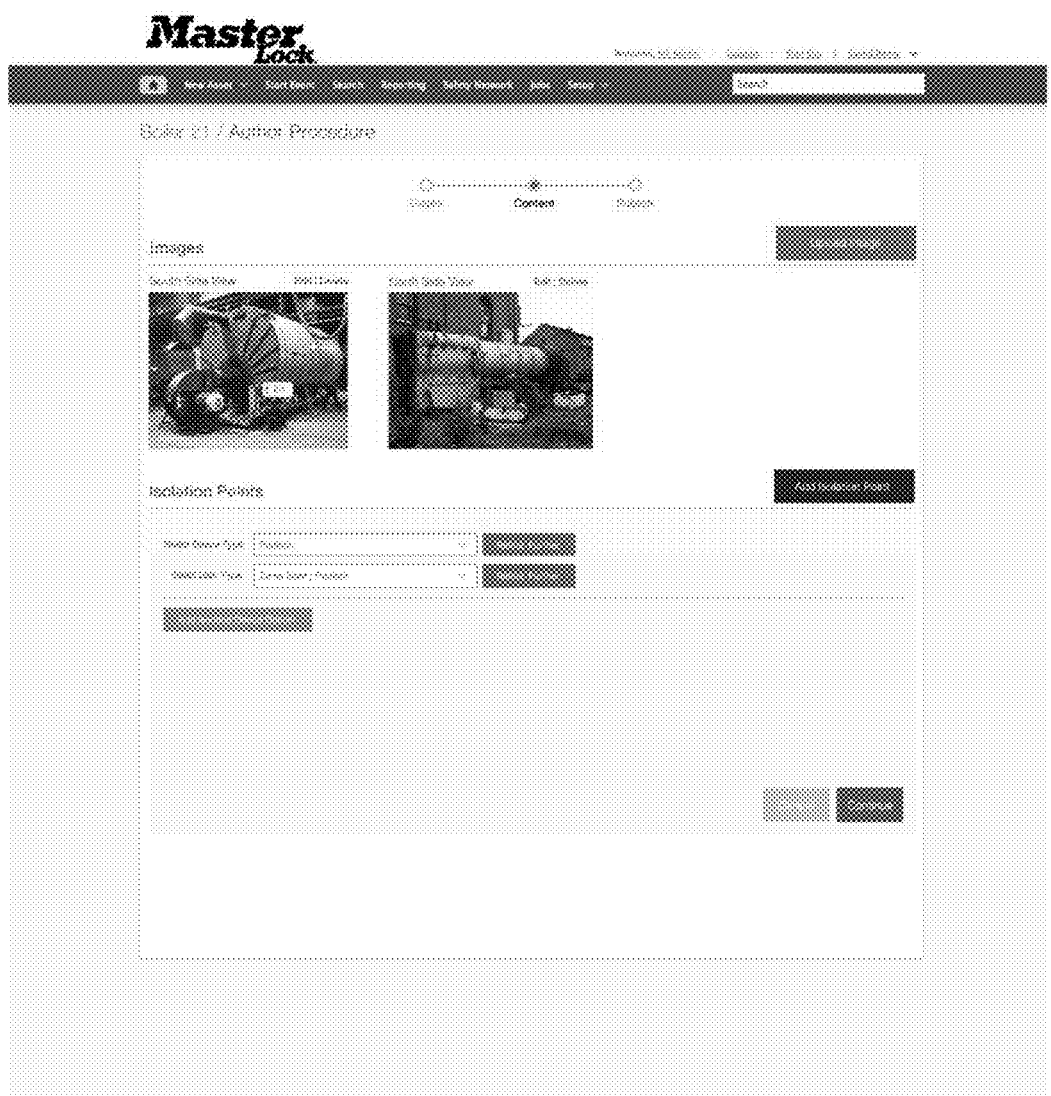
Figure 22:
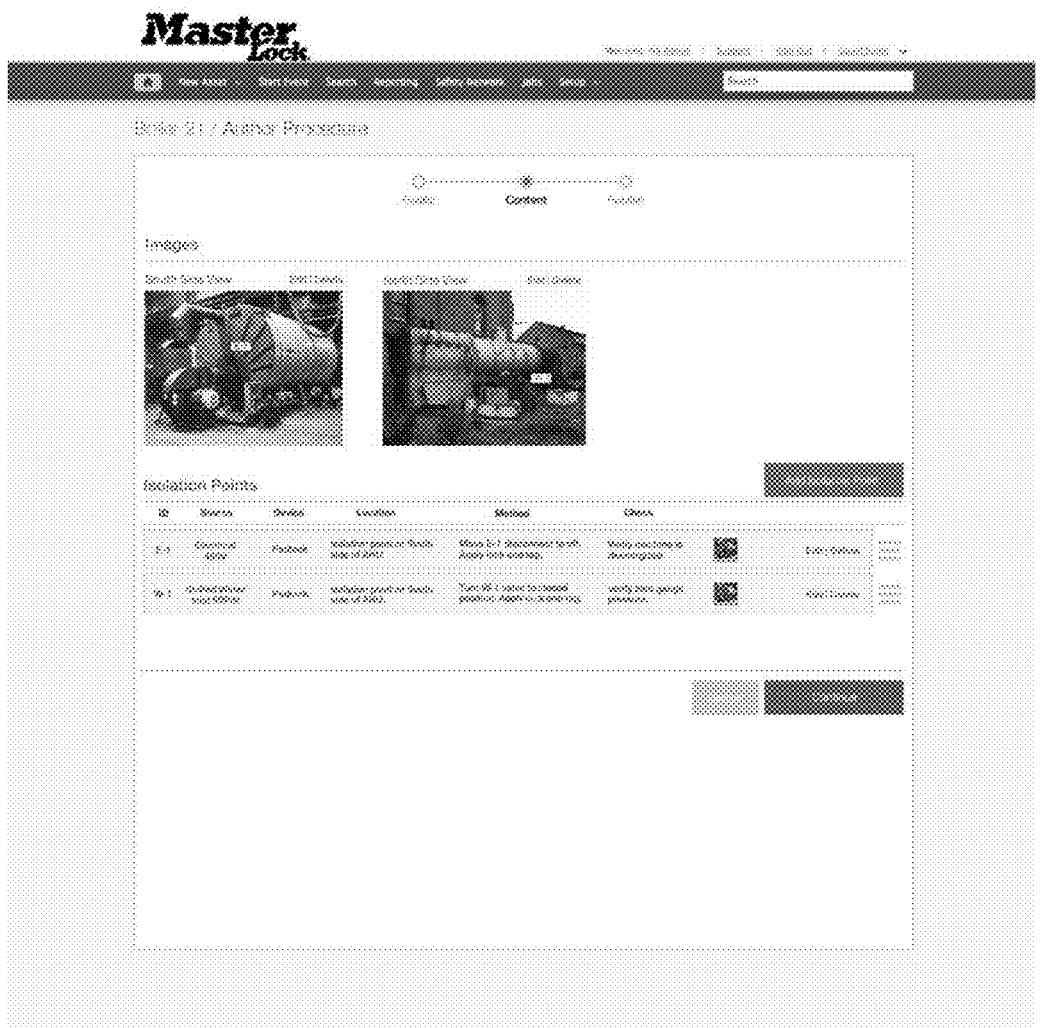

FIG. 21 is an exemplary screenshot continuing the process of creating a LOTO procedure. FIG. 21 is FIG. 17 to which two data for isolation points have already been added. In addition to the FIG. 17 functionality, in this example, logic provides icons with which a user can edit or delete an isolation point. In this example, logic presents a user software input with which a user can refine selected Devices and Locks. In this example, logic permits a user to first select the Device Type from a list of already setup Asset Types and permits a user to click Refine Further to permit the user to specify specific attributes about that lock and that device (for example, model #, color, material etc.). In this example, logic permits a user to click Add Another Device Option to permit the user to specify another option, e.g., specifying the of a Padlock or a Valve Cover. FIG. 22 shows the screen of FIG. 21 after two isolation points have been created for this LOTO procedure. In this example, logic permits a user to click and drag the icon on the right to different locations to re-order the isolation points for this procedure. The user activates the Continue icon to save this data and move to the next screen to either publish the LOTO procedure for use or submit the LOTO procedure for approval.

Figure 23:
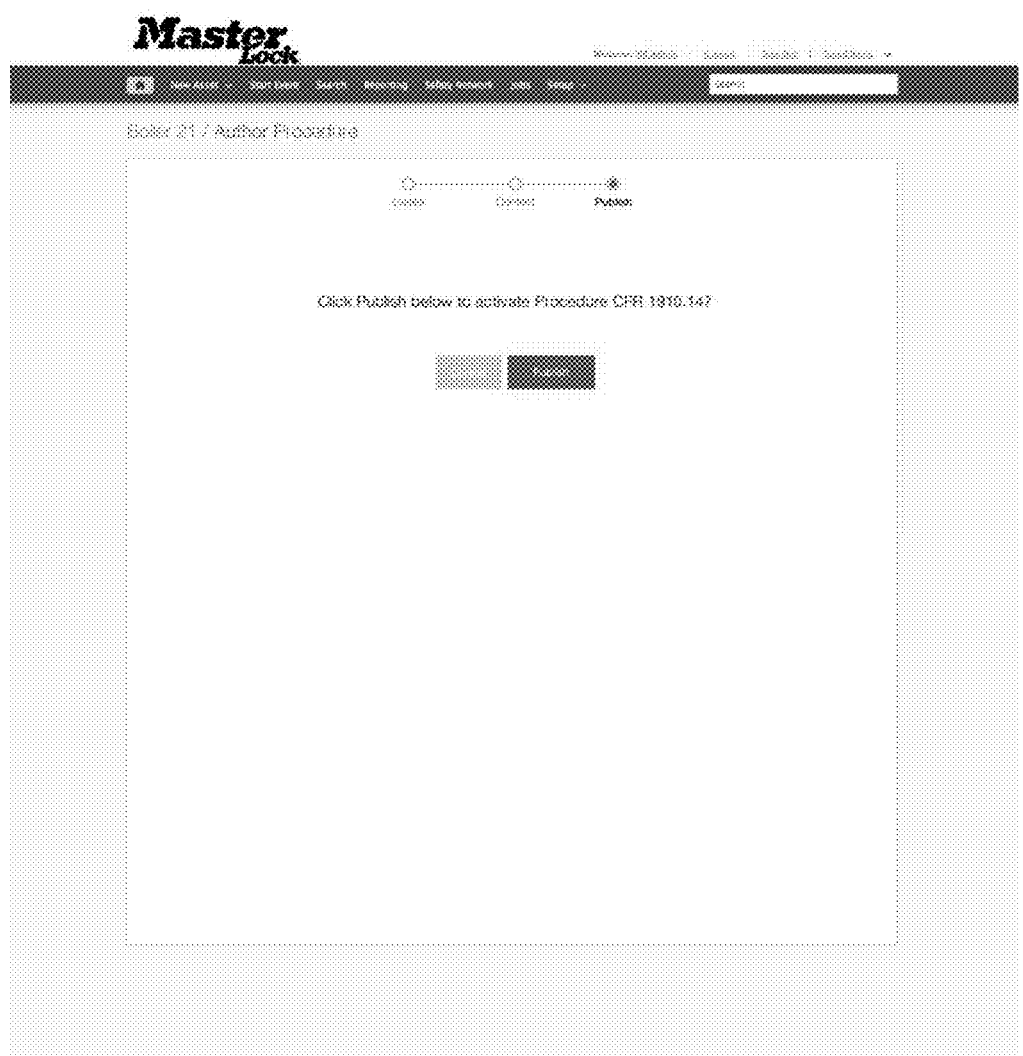
Figure 24:
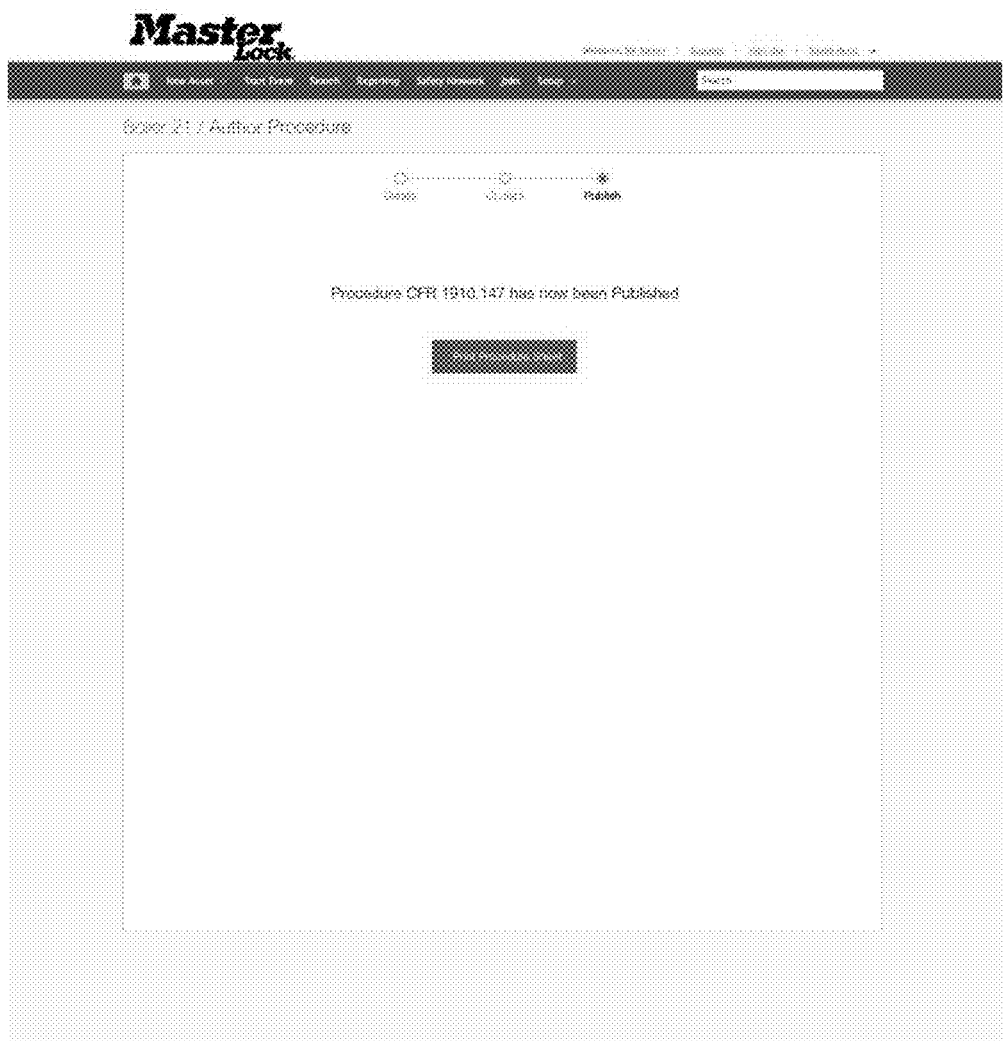

FIG. 23 is an exemplary screenshot for publishing a LOTO procedure for which no approval is required (see, FIG. 9 and the text associated with references 368, 374, and 376). In this example, logic permits a user to click a Publish icon to publish the LOTO procedure for use. FIG. 24 is an exemplary screenshot for printing a LOTO procedure sheet. As mentioned herein, in exemplary embodiments, logic automatically transmits a data file for a newly published LOTO procedure for automatic internal printing, for automatic printing by a third party, or bidding for printing by multiple third parties.

Figure 25:
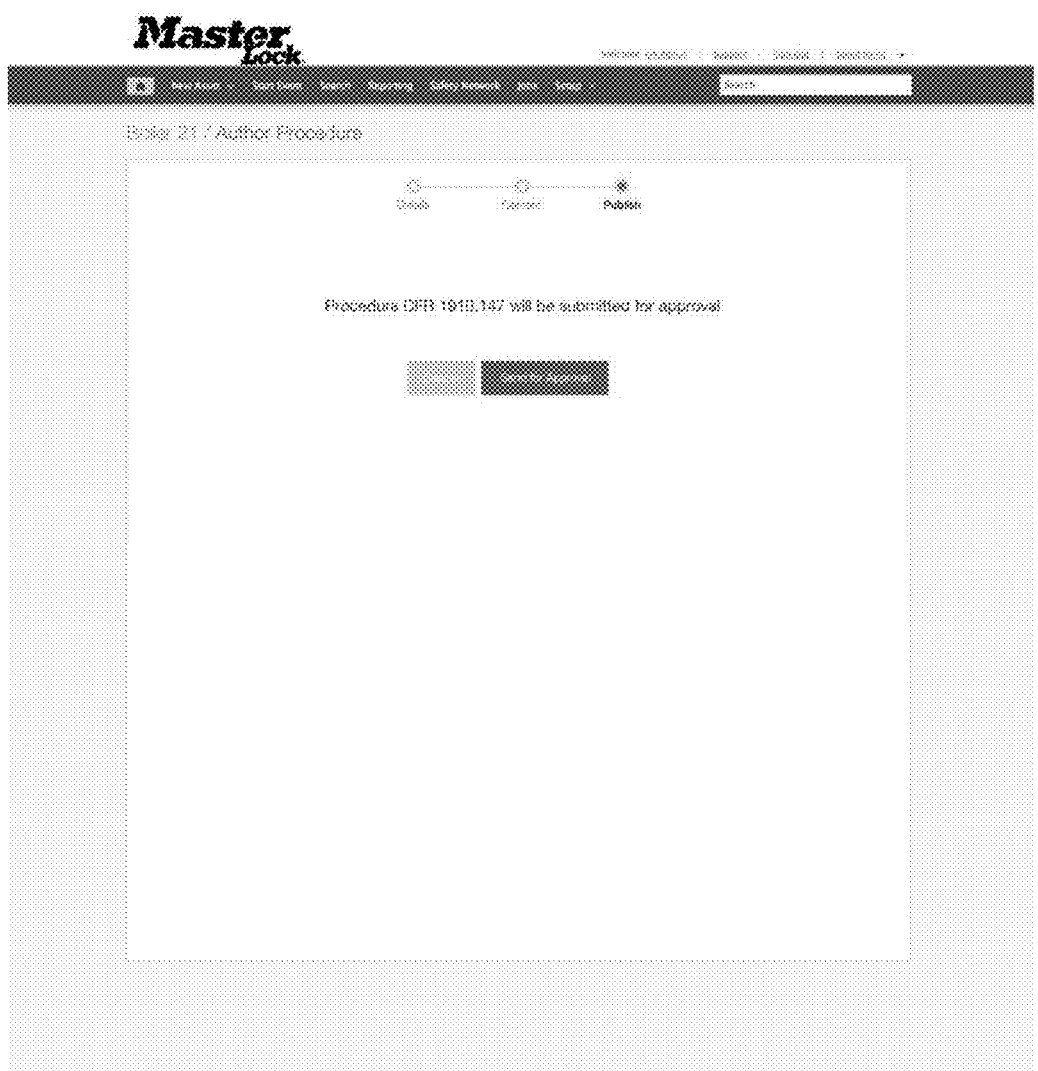

FIG. 25 is an exemplary screenshot for submitting a LOTO procedure for approval when approval is required (see, FIG. 9 and the text associated with references 368, 370, and 372). In this example, logic permits a user to click a Submit icon to submit the LOTO procedure for approval.

Additionally, use of the various systems and methods herein can be used to lower (or raise) insurance rates for an insured person (e.g., an insured human and/or an insured business entity). For example, an insurance company insuring the insured person can base insurance rates on the insured person's participation in any of the various systems and methods herein, such as whether the insured person uses any of the various systems and methods herein to do any one or any of the following: track attendance at safety meetings, track attendance at safety training, track worker training by a worker' respective LOTO class authorizations, performs inspections, perform LOTO procedures, tracks safety incidents, report safety incidents, submit data for safety score generation, other safety-related activities, etc. (collectively, "safety-related activities"). In exemplary embodiments, an insurance company uses one or more of the computers 528

(FIG. 15) and receives any or all of the data mentioned herein in the context of FIG. 15 as well as subscription data (e.g., who has subscribed to which of the various systems and methods herein) and usage data (e.g., to what extent are users of the various systems and methods actually using the various systems and methods in connection with safety-related activities). In exemplary embodiments, the insurance company performs any one or more of the following: (a) provides a discounted insurance rate to the insured person if the insured person subscribes or otherwise signs up to use any of the systems and methods herein in connection with any one or more safety-related activities (e.g., with the magnitude of the discount being based on the extent of the participation) or (b) provides a discounted insurance rate to the insured person if the insured person receives a safety score above or below a selected threshold. In exemplary embodiment, logic present to a user a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which the user (subject to permissions) sends a request to an insurance company and selects data to be sent to one or more computers associated with the insurance company either at the time the request is sent to the insurance company or thereafter. In exemplary embodiment, logic present to a user of an insurance company a software user input, e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which the insurance company user (subject to permissions) displays on an electronic display data pertaining to safety-related activities generated in connection with any of the systems and methods herein.

Also, some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the RFID reader 110 and the computers 114, 116 in the '911 Application can be modified to include logic to perform any one or more of the various functions and processes herein. As another example, all of the various functions and methods herein can be applied to any asset, e.g., elevators, personal protection equipment, etc. As yet another example, all of the systems and methods described herein with reference to LOTO procedures could also be used with other safety compliance procedures. As still another example, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

What is claimed is:

1. A computer-implemented method, comprising:
granting permission with a computer to a user based on data provided by the user comprising at least one of personnel data and security data;
storing a proposed lockout-tagout (LOTO) procedure created by a permitted user on one or more data storage devices;
determining with a computer whether the proposed LOTO procedure requires approval from authorization personnel based on LOTO procedure data of the proposed LOTO procedure;
displaying on an electronic display an indication that the proposed LOTO procedure requires approval responsive to a determination that the proposed LOTO procedure requires approval from authorization personnel; and
receiving with a computer approval data related to the proposed LOTO procedure from the one or more authorization personnel.

2. The method of claim 1, further comprising changing a status of the proposed LOTO procedure with a computer to permit the proposed LOTO procedure to be used as an actual LOTO procedure, responsive to a determination that the proposed LOTO procedure does not require approval from authorization personnel.

3. The method according to claim 2, further comprising sending with a computer a notification to a person associated with the proposed LOTO procedure that the proposed LOTO procedure has not been approved responsive to the approval data indicating that the proposed LOTO procedure has not been approved.

4. The method according to claim 2, further comprising changing with a computer a status of the proposed LOTO procedure to permit the proposed LOTO procedure to be used as an actual LOTO procedure responsive to the approval data indicating that the proposed LOTO procedure has been approved.

5. The method according to claim 4, further comprising archiving with a computer a then-current LOTO procedure and changing with a computer a status of the proposed LOTO procedure to permit the proposed LOTO procedure to be used in place of the then-current LOTO procedure responsive to the approval data indicating that the proposed LOTO procedure has been approved.

6. The method of claim 1, further comprising:
determining with a computer whether instituting the proposed LOTO procedure requires approval from authorization personnel;
displaying on an electronic display an indication that instituting the proposed LOTO procedure requires approval responsive to a determination that instituting the proposed LOTO procedure requires approval from authorization personnel; and
receiving with a computer approval data related to institution of the proposed LOTO procedure from the one or more authorization personnel.

7. A computer system, comprising:
one or more data storage devices for storing data related to a plurality of lockout-tagout (LOTO) procedures;
a processor configured to execute security code that grants permission to access the computer system to a plurality of users based on data provided by the users comprising at least one of personnel data and security data; and
a processor configured to execute LOTO administration code that provides user interfaces to a plurality of permitted users with which the permitted users can:

access and view LOTO procedure data from the one or more data storage devices;

edit LOTO procedure data and save the edited LOTO procedure data to the one or more data storage devices;

request authorization for a proposed LOTO procedure to be used as an actual LOTO procedure; and a processor configured to execute LOTO procedure approval code that:

determines whether a proposed LOTO procedure requires approval from authorization personnel;

provides to one or more authorization personnel an indication that the proposed LOTO procedure requires approval responsive to a determination that the proposed LOTO procedure requires approval from authorization personnel; and receives approval data related to the proposed LOTO procedure from the one or more authorization personnel.

8. The computer system of claim 7, wherein the LOTO procedure approval code changes a status of the proposed LOTO procedure to permit the proposed LOTO procedure to be used as an actual LOTO procedure responsive to the proposed LOTO procedure not requiring approval from authorization personnel.

9. The computer system according to claim 8, wherein the LOTO procedure approval code sends a notification to a person associated with the proposed LOTO procedure that the proposed LOTO procedure has not been approved responsive to the approval data indicating that the proposed LOTO procedure has not been approved.

10. The computer system according to claim 8, wherein the LOTO procedure approval code changes a status of the proposed LOTO procedure to permit the proposed LOTO procedure to be used as an actual LOTO procedure responsive to the approval data indicating that the proposed LOTO procedure has been approved.

11. The computer system according to claim 10, wherein the LOTO procedure approval code archives a then-current LOTO procedure and changing a status of the proposed LOTO procedure to permit the proposed LOTO procedure to be used in place of the then-current LOTO procedure responsive to the approval data indicating that the proposed LOTO procedure has been approved.

* * * * *